(12) United States Patent
Pang et al.

(10) Patent No.: US 12,316,844 B2
(45) Date of Patent: May 27, 2025

(54) 3D POINT CLOUD ENHANCEMENT WITH MULTIPLE MEASUREMENTS

(71) Applicant: InterDigital VC Holdings, Inc., Wilmington, DE (US)

(72) Inventors: Jiahao Pang, Plainsboro, NJ (US); Xue Zhang, Toronto (CA); Gene Cheung, Toronto (CA); Dong Tian, Boxborough, MA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 56 days.

(21) Appl. No.: 17/795,149

(22) PCT Filed: Feb. 5, 2021

(86) PCT No.: PCT/US2021/016895
§ 371 (c)(1),
(2) Date: Jul. 25, 2022

(87) PCT Pub. No.: WO2021/158974
PCT Pub. Date: Aug. 12, 2021

(65) Prior Publication Data
US 2023/0056576 A1    Feb. 23, 2023

Related U.S. Application Data

(60) Provisional application No. 62/970,956, filed on Feb. 6, 2020.

(51) Int. Cl.
*H04N 19/70* (2014.01)
*H04N 19/124* (2014.01)
(Continued)

(52) U.S. Cl.
CPC ......... *H04N 19/124* (2014.11); *H04N 19/172* (2014.11); *H04N 19/463* (2014.11); *H04N 19/597* (2014.11); *H04N 19/85* (2014.11)

(58) Field of Classification Search
CPC .............. G06T 2210/56; H04N 19/124; H04N 19/172; H04N 19/463; H04N 19/597;
(Continued)

(56) References Cited

U.S. PATENT DOCUMENTS 11,549,805 B2 * 1/2023 Gan ................... G01B 11/2504
11,889,114 B2 * 1/2024 Iguchi .................... H04N 19/70
(Continued)

FOREIGN PATENT DOCUMENTS

CA       3070678 A1    1/2019
CN     108961320 A    12/2018
(Continued)

OTHER PUBLICATIONS

G—PCC coding description v4; Jul. 2019. (Year: 2019).*
(Continued)

*Primary Examiner* — Luis Perez-Fuentes
(74) *Attorney, Agent, or Firm* — Klintworth & Rozenblat IP LLP

(57) ABSTRACT

Systems and methods are described for refining first point cloud data using at least second point cloud data and one or more sets of quantizer shifts. An example point cloud decoding method includes obtaining data representing at least a first point cloud and a second point cloud; obtaining information identifying at least a first set of quantizer shifts associated with the first point cloud; and obtaining refined point cloud data based on at least the first point cloud, the first set of quantizer shifts, and the second point cloud. The obtaining of the refined point cloud data may include performing a subtraction based on at least the first set of quantizer shifts. Corresponding encoding systems and methods are also described.

20 Claims, 13 Drawing Sheets

(51) Int. Cl.
*H04N 19/172* (2014.01)
*H04N 19/44* (2014.01)
*H04N 19/463* (2014.01)
*H04N 19/597* (2014.01)
*H04N 19/85* (2014.01)

(58) Field of Classification Search
CPC ........ H04N 19/85; H04N 19/70; H04N 19/96; H04N 19/436
See application file for complete search history.

(56) References Cited

U.S. PATENT DOCUMENTS

| | | | |
|---|---|---|---|
| 12,159,436 B2* | 12/2024 | Zhang | H04N 19/597 |
| 12,159,437 B2* | 12/2024 | Yang | G06F 16/22 |
| 2017/0347100 A1 | 11/2017 | Chou | |
| 2019/0304139 A1* | 10/2019 | Joshi | G06T 9/001 |
| 2019/0311502 A1 | 10/2019 | Mammou | |
| 2020/0021844 A1 | 1/2020 | Yea | |
| 2020/0021856 A1 | 1/2020 | Tourapis | |
| 2020/0219290 A1* | 7/2020 | Tourapis | H04N 19/597 |
| 2020/0234491 A1* | 7/2020 | Pöyhtäri | G01S 17/89 |
| 2024/0114167 A1 | 4/2024 | Iguchi et al. | |

FOREIGN PATENT DOCUMENTS

| | | |
|---|---|---|
| CN | 110691243 A | 1/2020 |
| EP | 3554074 A1 | 10/2019 |
| JP | 2024061790 A | 5/2024 |
| WO | 2019050931 A1 | 3/2019 |
| WO | 2019078696 A1 | 4/2019 |
| WO | 2019182811 A1 | 9/2019 |
| WO | 2019183113 A1 | 9/2019 |
| WO | 2020175176 A1 | 9/2020 |

OTHER PUBLICATIONS

Point cloud compression proposed by Sony; Oct. 2017. (Year: 2017).*
Signaling of QP variations for Adaptive geometry quantization in Point cloud coding; 2019. (Year: 2019).*
Kim, M. et al., "Development of Multiview Image Generation Simulator for Depth Map Quantization" In International Conference on Virtual, Augmented and Mixed Reality (pp. 58-64). Springer, Berlin, Heidelberg. Jul. 2013.
Wei, Ku-Chu . et al., "Quantization error reduction in depth maps." In 2013 IEEE International Conference on Acoustics, Speech and Signal Processing, pp. 1543-1547. IEEE, 2013.
Gauthier, L. et al., "Understanding MPEG-I coding standardization in immersive VR/AR applications." SMPTE motion imaging journal 128, No. 10 (2019): 33-39.
International Search Report and Written Opinion for PCT/US2021/016895 (10 pages).
International Preliminary Report on Patentability for PCT/2021/016895 issued Jul. 28, 2022 (7 pages).
Furukawa, Y. et al., "Accurate, Dense, and Robust Multiview Stereopsis." IEEE transactions on pattern analysis and machine intelligence 32, No. 8, 2009 (8 pages).
Han, J. et al., "Enhanced computer vision with microsoft kinect sensor: A review." IEEE transactions on cybernetics vol. 43, No. 5, 2013 pp. 1318-1334 (17 pages).
Wan, P. et al., "High Bit-Precision Image Acquisition and Reconstruction by Planned Sensor Distortion." In 2014 IEEE International Conference on Image Processing (ICIP), pp. 1773-1777. IEEE, 2014 (5 pages).
Wan, P. et al., "Precision Enhancement of 3-D Surfaces From Compressed Multiview Depth Maps." IEEE Signal Processing Letters 22, No. 10 (2015 (6 pages).
Schnabel, R. "Octree-based Point-Cloud Compression." PBG@ SIGGRAPH 3, 2006 (11 pages).
Gumhold, S. et al., "Predictive point-cloud compression." In ACM SIGGRAPH 2005 Sketches, p. 137, 2005 (1 page).
Loop, C. "Computing Rectifying Homographies For Stereo Vision." In Proceedings. 1999 IEEE Computer Society Conference on Computer Vision and Pattern Recognition (Cat. No PR00149), vol. 1, IEEE, 1999 (14 pages).
Kang, Y.-S. et al., "An Efficient Image Rectification Method For Parallel Multi-Camera Arrangement." IEEE transactions on Consumer Electronics vol. 57, No. 3, 2011 pp. 1041-1048 (8 pages).
Zhang, Zhengyou, "A Flexible New Technique for Camera Calibration". Microsoft Corporation, MSR-TR-98-71, last updated on Aug. 13, 2008, (22 pages).
Zhang, Z., "A Flexible New Technique for Camera Calibration" in IEEE Transactions on Pattern Analysis & Machine Intelligence, vol. 22, No. 11, pp. 1330-1334, 2000 (5 pages).
Scharstein, D. et al., "High-accuracy stereo depth maps using structured light." In 2003 IEEE Computer Society Conference on Computer Vision and Pattern Recognition, 2003. Proceedings., vol. 1, IEEE, 2003 (8 pages).
Jin, J. et al., "Region-aware 3-D warping for DIBR." IEEE Transactions on Multimedia vol. 18, No. 6, Jun. 2016, pp. 953-966 (14 pages).
Cheung, G. "Graph spectral image processing." Proceedings of the IEEE 106, No. 5, 2018 (22 pages).
Qu, Huamin, et al., "A Framework for Sample-Based Rendering with O-Buffers". Proceedings of the 14th IEEE Visualization Conference (VIS' 2003), Oct. 19-24, 2003, Seattle, Washington, pp. 441-448 (8 pages).

* cited by examiner

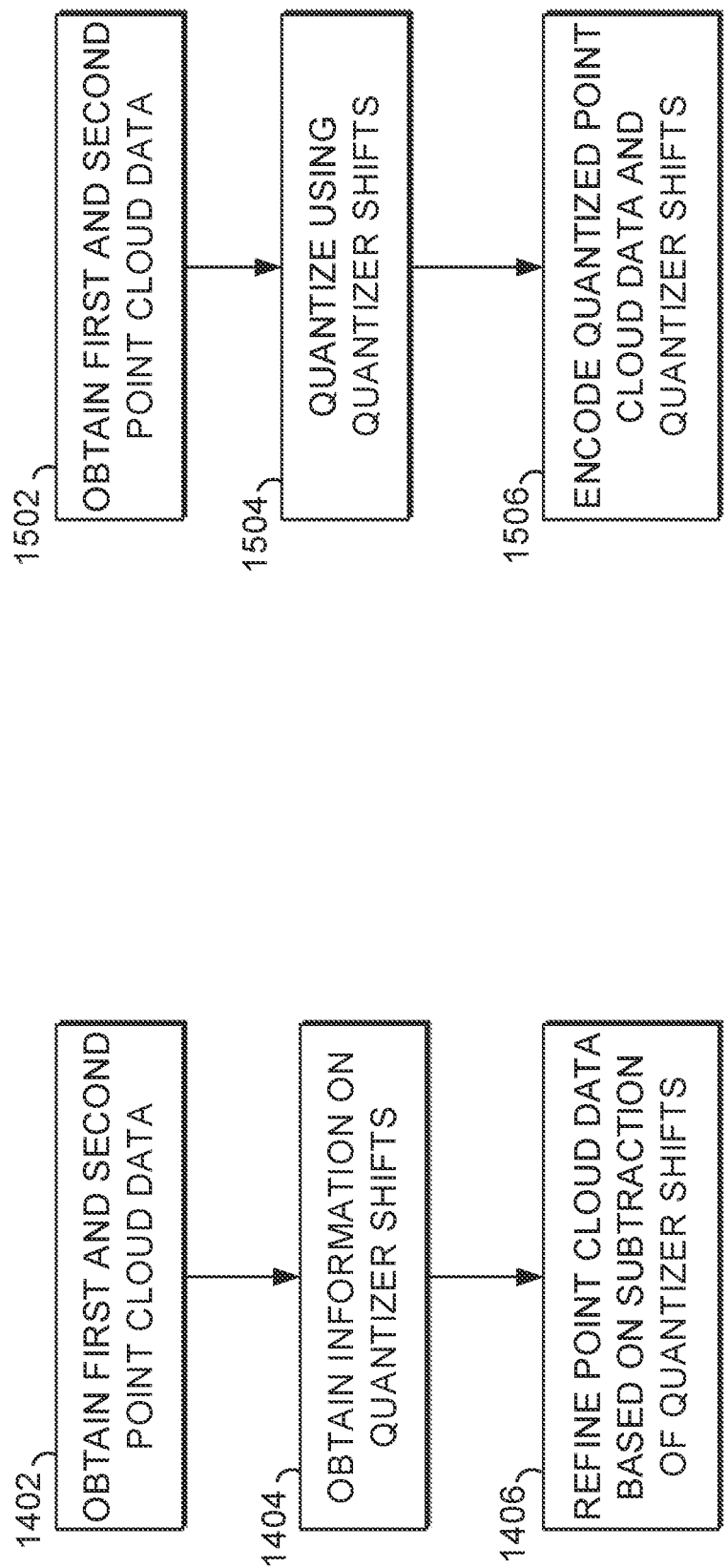

3D POINT CLOUD ENHANCEMENT WITH MULTIPLE MEASUREMENTS

CROSS-REFERENCE TO RELATED APPLICATIONS

The present application is a national stage application under 35 U.S.C. § 371 of International Application No. PCT/US2021/016895, entitled "3D POINT CLOUD ENHANCEMENT WITH MULTIPLE MEASUREMENTS," filed on Feb. 5, 2021, which claims benefit under 35 U.S.C. § 119(e) from U.S. Provisional Patent Application No. 62/970,956, filed Feb. 6, 2020, entitled "3D Point Cloud Enhancement with Multiple Measurements," which is incorporated herein by reference in its entirety.

BACKGROUND

The disclosure relates to the field of point cloud processing and compression. This field relates to the analysis, interpolation and representation of point cloud signals.

As a discrete representation of continuous surfaces in the 3D space, point clouds may be classified into categories including: organized point clouds, such as those collected by camera-like 3D sensors or 3D laser scanners and arranged on a grid, and unorganized point clouds, such as those that, due to their complex structure, are scanned from multiple viewpoints and are subsequently fused together leading to the loss of ordering of indices. Organized point clouds may be easier to process as the underlying grids imply natural spatial connectivity that may reflect the sensing order. On the contrary, the processing on unorganized point clouds may be more challenging. This is due to a fact that unorganized point clouds are different from 1D speech data or 2D images, which are associated with regular lattices. Instead, they are often sparsely and irregularly scattered in the 3D space; this makes traditional latticed-based algorithms difficult to handle 3D point clouds. For example, the convolution operator is well defined on regular lattices but cannot be directly applied to 3D point clouds.

Furthermore, point clouds may represent a sequential representation of the same scene, which contains multiple moving objects. They are called dynamic point clouds as compared to static point clouds captured from a static scene or static objects. Dynamic point clouds may be organized into frames, with different frames being captured at different time.

Point clouds may be used for various purposes such as representing objects of cultural heritage in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and often include a large number of points.

Another use case is in topography and cartography in which, using 3D representations, maps are not limited to the plane and may include the relief. Google Maps is now a good example of 3D maps, but it generally uses meshes instead of point clouds. Nevertheless, point clouds may be a suitable data format for 3D maps and such point clouds are typically static, colored and often include a large number of points.

Automotive industry and autonomous car technologies are also domains in which point clouds may be used. Autonomous cars should be able to "probe" their environment to take good driving decision based on the reality of their immediate neighboring. Typical sensors like LIDARs produce dynamic point clouds that are used by the decision engine. These point clouds are not intended to be viewed by a human being and they are typically small, not necessarily colored, and dynamic with a high frequency of capture. They may have other attributes like the reflectance provided by the LIDAR, as this attribute is a good indicator of the material of the sensed object and may help the decision.

Virtual Reality and immersive worlds are of increasing interest. Such technologies attempt to immerse the viewer in an environment all round him, unlike standard TV where he can only look at the virtual world in front of him. There are several gradations in the immersivity depending on the freedom of the viewer in the environment. Point cloud is a good format candidate to distribute Virtual Reality (or VR) worlds. They may be static or dynamic and are typically of averaged size, say no more than millions of points at a time.

It is desirable to be able to distribute dynamic point clouds to the end-user with a reasonable consumption of bit-rate while maintaining an acceptable (or preferably very good) quality of experience. Efficient compression of these dynamic point clouds may assist in making the distribution chain of immersive worlds practical.

SUMMARY

A point cloud decoding method according to some embodiments includes: obtaining data representing at least a first point cloud and a second point cloud; obtaining information identifying at least a first set of quantizer shifts associated with the first point cloud; and obtaining refined point cloud data based on at least the first point cloud, the first set of quantizer shifts, and the second point cloud.

A point cloud decoder apparatus according to some embodiments includes a processor configured to perform at least: obtaining data representing at least a first point cloud and a second point cloud; obtaining information identifying at least a first set of quantizer shifts associated with the first point cloud; and obtaining refined point cloud data based on at least the first point cloud, the first set of quantizer shifts, and the second point cloud.

In some embodiments, obtaining the refined point cloud data comprises performing a subtraction based on at least the first set of quantizer shifts.

Some embodiments further include obtaining information identifying a second set of quantizer shifts associated with the second point cloud, the second set of quantizer shifts being different from the first set of quantizer shifts; wherein obtaining the refined point cloud data is further based on the second set of quantizer shifts. In some such embodiments, obtaining the refined point cloud data comprises performing a subtraction based on at least the first set of quantizer shifts and the second set of quantizer shifts.

In some embodiments, the first point cloud represents a left view of a scene and the second point cloud represents a right view of the scene.

In some embodiments, the first point cloud and the second point cloud are frames associated with different times.

In some embodiments, the first set of quantizer shifts comprises at least a first shift associated with a first point in the first point cloud and a different second shift associated with a second point in the first point cloud.

In some embodiments, the data representing the first point cloud comprises a first parameter ($y_1$) having a first quantization range, the data representing the second point cloud comprises a second parameter ($y_2$) having a second quantization range, and wherein obtaining the refined point cloud data comprises obtaining a third parameter ($\tilde{x}$) in the quantization range of both the first parameter ($y_1$) and the second parameter ($y_2$).

In some embodiments, obtaining the refined point cloud data ($x_l$) based on the first point cloud ($y_l$) and the second point cloud ($y_r$) comprises selecting the refined first point cloud ($x_l$) to substantially maximize a product of factors comprising one or more of the following factors:

a conditional probability $Pr(y_l|x_l)$ of the first point cloud ($y_l$) given the refined first point cloud ($x_l$), a conditional probability $Pr(y_r|g(x_l))$ of the second point cloud ($y_r$) given an estimate $g(x_l)$ of a second refined point cloud ($x_r$), where the estimate $g(x_l)$ is based on the first refined point cloud ($x_l$), a prior probability $Pr(x_l)$ of the first refined point cloud data ($x_l$), and a prior probability $Pr(g(x_l))$ of the estimate $g(x_l)$ of the second refined point cloud ($x_r$).

A point cloud encoding method according to some embodiments includes: obtaining data representing at least a first point cloud and a second point cloud; quantizing the first point cloud and the second point cloud, wherein quantizing the point cloud data comprises adding at least a first set of quantizer shifts to the first point cloud data; and encoding in a bitstream the quantized first and second point clouds.

A point cloud encoding apparatus according to some embodiments includes a processor configured to perform at least: obtaining data representing at least a first point cloud and a second point cloud; quantizing the first point cloud and the second point cloud, wherein quantizing the point cloud data comprises adding at least a first set of quantizer shifts to the first point cloud data; and encoding in a bitstream the quantized first and second point clouds.

Some embodiments further comprise encoding in the bitstream information indicating the first set of quantizer shifts.

In some embodiments, quantizing the first point cloud and the second point cloud further comprises adding a second set of quantizer shifts to the second point cloud, further comprising encoding in the bitstream information indicating the second set of quantizer shifts.

In some embodiments, the first point cloud represents a left view of a scene and the second point cloud represents a right view of the scene.

In an example embodiment, method includes: receiving initial first point cloud data ($y_1$) and at least initial second point cloud data ($y_r$); and selecting refined first point cloud data ($x_l$) to substantially maximize a product of factors, where the factors include at least: a conditional probability $Pr(y_l|x_l)$ of the initial first point cloud data ($y_l$) given the refined first point cloud data ($x_l$); a conditional probability $Pr(y_r|g(x_l))$ of the initial second point cloud data ($y_r$) given an estimate $g(x_l)$ of refined second point cloud data ($x_r$), where the estimate $g(x_l)$ is based on the refined first point cloud data ($x_l$); a prior probability $Pr(x_l)$ of the refined first point cloud data ($x_l$), and a prior probability $Pr(g(x_l))$ of the estimate $g(x_l)$ of refined second point cloud data ($x_r$).

Some embodiments further include, after selecting the refined first point cloud data ($x_l$), subtracting a quantizer shift $\delta_l$ from the refined first point cloud data.

In some embodiments, selecting the refined first point cloud data ($x_l$) is performed iteratively.

In some embodiments, selecting the refined first point cloud data ($x_l$) to substantially maximize the product of the factors includes selecting the refined first point cloud data ($x_l$) to substantially minimize a sum of negative logarithms of the factors. The selecting of the refined first point cloud data ($x_l$) to substantially minimize a sum of negative logarithms of the factors may be performed using a gradient descent method.

In some embodiments, the conditional probability $Pr(y_l|x_l)$ of the initial first point cloud data ($y_l$) given the refined first point cloud data ($x_l$) is represented by a linear function of a difference between the initial first point cloud data ($y_l$) and the refined first point cloud data ($x_l$).

In some embodiments, the estimate $g(x_l)$ of refined second point cloud data ($x_r$) is a linear function of the refined second point cloud data ($x_r$).

In some embodiments, the conditional probability $Pr(y_r|g(x_l))$ of the initial second point cloud data ($y_r$) given the estimate $g(x_l)$ of refined second point cloud data ($x_r$) is represented by a linear function of a difference between the initial second point cloud data ($y_r$) and the estimate $g(x_l)$ of refined second point cloud data ($x_r$).

In some embodiments, the prior probability $Pr(x_l)$ of the refined first point cloud data ($x_l$) is represented by $\exp(-x_l^T L_l x_l/\sigma^2)$, where $L_l$ is a graph Laplacian matrix.

In some embodiments, the prior probability $Pr(g(x_l))$ of the estimate $g(x_l)$ of refined second point cloud data ($x_r$) is represented by $\exp(-g(x_l)^T L_r g(x_l)/\sigma^2)$, where $L_r$ is a graph Laplacian matrix.

Some embodiments further include receiving first point cloud data and at least second point cloud data; and refining the first point cloud data using at least the second point cloud data. Some such embodiments further include, after refining the first point cloud data, subtracting a quantizer shift from the refined first point cloud data. In some embodiments, the quantizer shift is a predetermined quantizer shift.

In some embodiments, an encoding method includes: receiving initial first point cloud data and at least initial second point cloud data; processing the initial first and second point cloud data by a method comprising adding a first set of quantizer shifts $\delta_1$ to the first point cloud data; and encoding the processed first and second point cloud data.

In some embodiments, processing the initial first and second point cloud data further includes adding a second set of quantizer shifts $\delta_2$ to the second point cloud data. The first set of quantizer shifts $\delta_1$ may be different from the second set of quantizer shifts $\delta_2$.

In some embodiments, the encoding method further includes providing information identifying at least one of (i) the first set of quantizer shifts $\delta_1$ or (ii) the second set of quantizer shifts $\delta_2$ along with the encoded first and second point cloud data.

In some embodiments, a decoding method includes: receiving encoded first point cloud data and at least encoded second point cloud data; receiving information identifying at least a first set of quantizer shifts $\delta_1$; decoding the first point cloud data and at least the second point cloud data; refining the decoded first point cloud data using the decoded second point cloud data; and subtracting the first set of quantizer shifts $\delta_1$ from the first point cloud data.

In some embodiments, any of the systems or methods described herein may be used to refine depth data in a format other than a point cloud format. For example, the systems and methods described herein may be used to refine depth data (e.g. depth data $x_l$, $x_r$) in RGB-D or other depth map format.

Some embodiments of an apparatus include a processor configured to perform at least one or more of the methods described herein.

Some embodiments of an apparatus include a processor and a computer-readable medium storing instructions operative to perform at least one or more of the methods described herein. The computer-readable medium may be a non-transitory computer-readable medium.

Some embodiments include a computer-readable medium storing point cloud data encoded using one or more of the methods described herein. The medium may be a non-transitory computer-readable medium.

BRIEF DESCRIPTION OF THE DRAWINGS

FIG. 14 is a flow diagram of an example point cloud encoding method according to some embodiments.

FIG. 15 is a flow diagram of an example point cloud decoding method according to some embodiments.

EXAMPLE NETWORKS FOR IMPLEMENTATION OF THE EMBODIMENTS

Figure 1A:
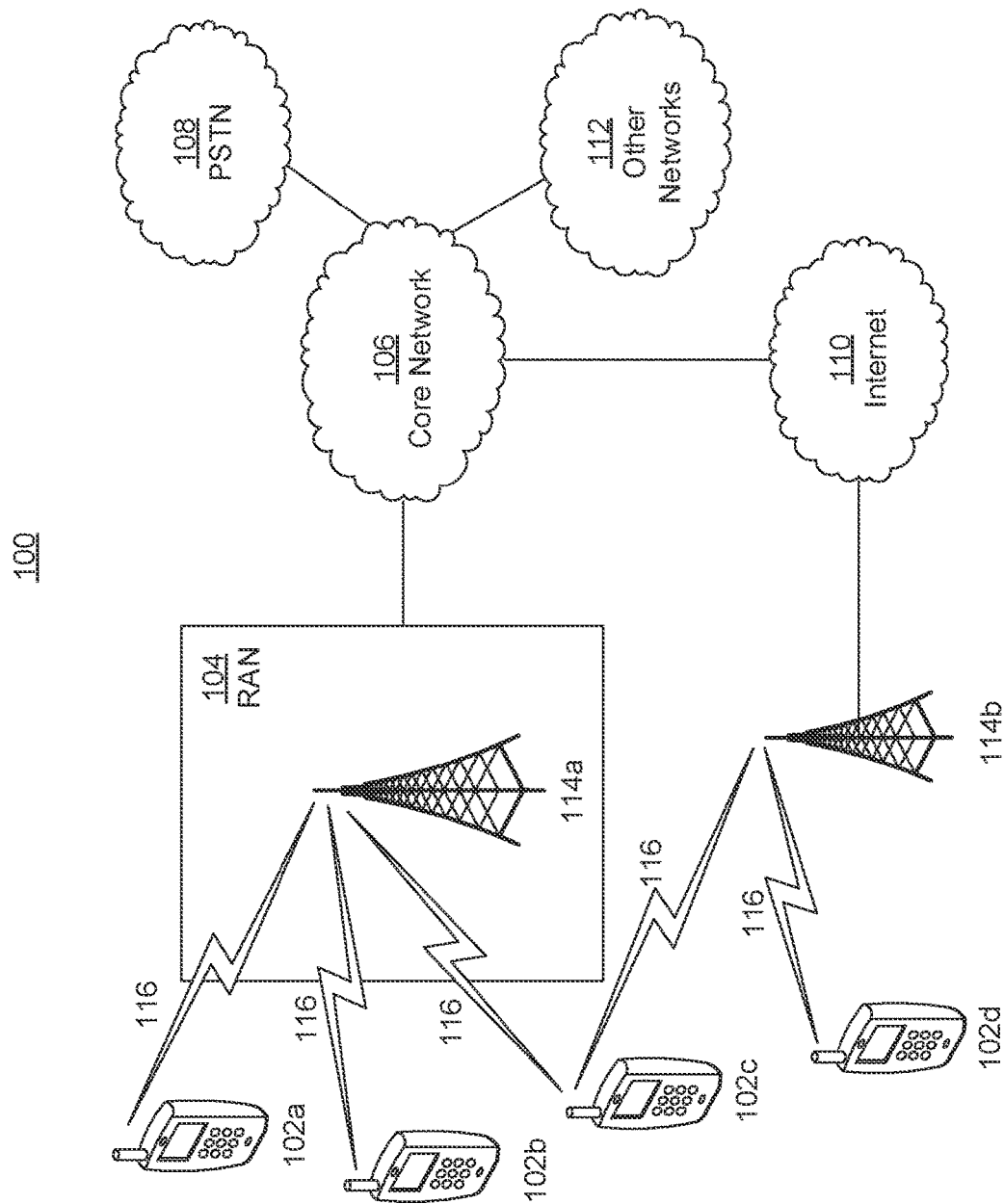
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (Wireless Fidelity (WiFi), IEEE 802.16 (Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
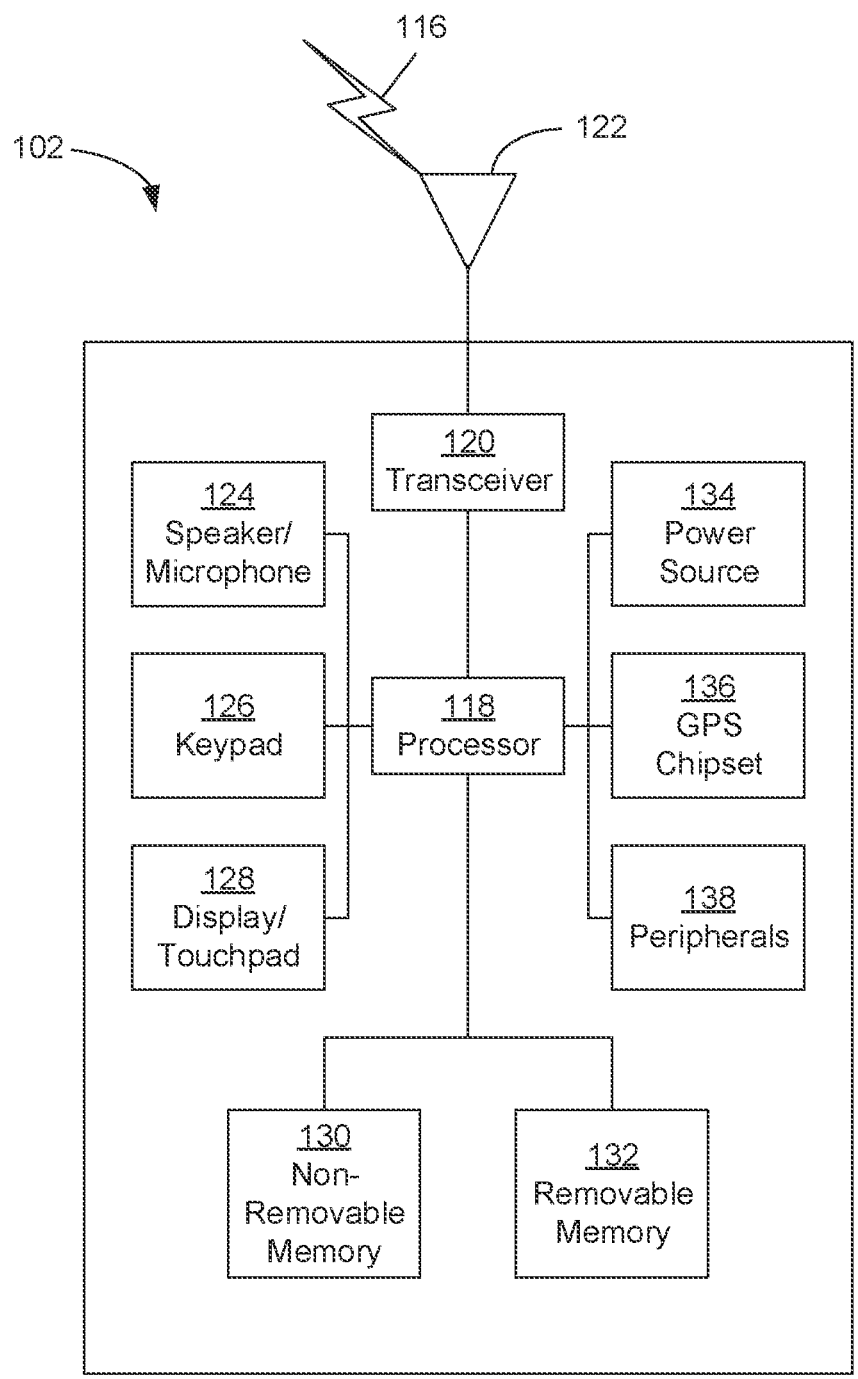
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein with regard to one or more of: WTRU 102a-d, Base Station 114a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION 3D point cloud data may represent samples on the surfaces of objects or scenes. When collecting/processing dynamic point cloud, data samples of the same object often appear in different observations, which are strongly correlated through 2D-to-3D projections. In other words, in the overlapped region between different observations, we have more multiple measurements of the same 3D scene, e.g., FIG. 2B. Even for measurements appearing within the same observation, we can regard them as different measurements of the same object, given information that they are highly correlated, e.g., FIG. 4. Example embodiments operate to exploit the correlation across different observations in the point cloud to improve the quality of the point cloud.

Some embodiments jointly perform denoising and dequantization for 3D point cloud data via correlated measurements from multiple observations. Not only quantized but also noise-corrupted observations per measurement may be considered as coded quantization bins for performance of the reconstruction. Some embodiments intentionally shift the quantization bins applied to the noised-corrupted point cloud data. By doing so, when taking the correlation of multiple observations into account, it may further narrow down the plausible range of the measurements compared to the case where the quantization bins are strictly aligned.

Example embodiments are not restricted to point cloud data obtained from any particular type of depth sensors. Various different depth sensors, ranging from low-end sensors like time-of-flight (ToF) sensors and structured light sensors to high-end sensors like LiDAR, laser scanner, etc., or synthesized data using computer graphics are data sources that can be used in various embodiments.

In some embodiments, systems and methods disclosed herein are used to enhance 3D point cloud quality during acquisition with depth sensors. In other embodiments, the systems and methods herein are applied to point cloud compression (PCC). In some existing PCC approaches, a current frame to be processed may use one or more reference frames for compression. In some embodiments, the reference frames also use the information from the current frame to enhance its own reconstruction, such that point cloud frames may refer to one another for reconstruction. On the encoder side, there is the ability to intentionally shift the quantization bins being applied to point cloud data; while on the decoder side, multiple correlated observations may be combined to enhance the point cloud data, leading to reconstructions with higher precision. There are various PCC-based use cases for systems and methods as described herein. Some embodiments operate to enhance the precision of point cloud data encoded with either inter-frame coding or intra-frame coding. Some embodiments are applied when any specific coding structure, e.g., octree, is used at the encoder. If transform coding is adopted to the encoding of a point cloud video, some embodiments directly operate in the transform domain to provide higher precision.

While depth sensors are now lightweight and common, obtained measurements are often coarse in precision and can be corrupted by noise. However, when capturing 3D data—especially sequences of 3D data in a particular scene—the same (or highly-correlated) scene (or object) has likely been captured multiple times. In other words, different observations are likely to have been made about the same subject. Consequently, example embodiments use different observations of the same subject in the depth measurements of point cloud data to jointly enhance the precision of the observations, while these observations may be noise corrupted and undergone quantization errors. Such techniques may be applied for point cloud compression in some embodiments.

Overview of an Example Embodiment

Figure 2A:
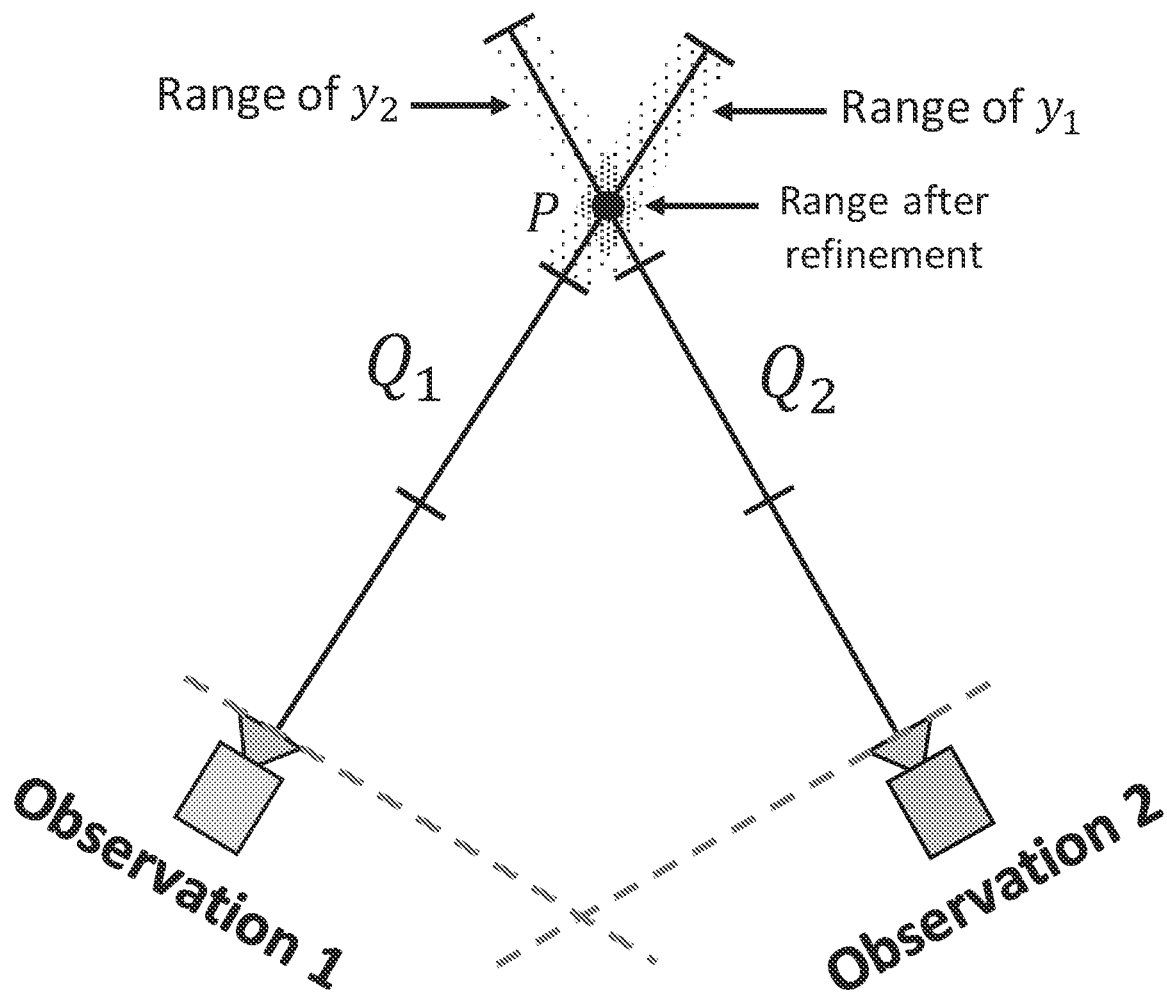
FIG. 2A is a schematic illustration providing an example of refining point cloud data from two independent measurements of the same point.

An example embodiment uses different observations in point cloud data to jointly enhance the quality of the measurements. FIG. 2A illustrates measurement of the depth of the point P by two different observations, Observation 1 and Observation 2. An observation here may be a view measured by depth sensors during acquisition, or it may be a frame in a point cloud sequence in the case of point cloud compression. In this example, to simplify the description, suppose the measurements are noiseless. The measurements are quantized by two quantizers, $Q_1$ and $Q_2$, in order to be represented with a certain number of bits. The quantization leads to two different uncertainty ranges. Given that the camera pose is known (or may be estimated by the obtained point cloud data or otherwise), the intersection of both the two uncertainty ranges may be considered, leading to a much narrower uncertainty range, and, in turn, higher accuracy. Example embodiments are not limited to only two observations: analogous reasoning can be applied when three or more observations or measurements are made of the same object.

Figure 2B:
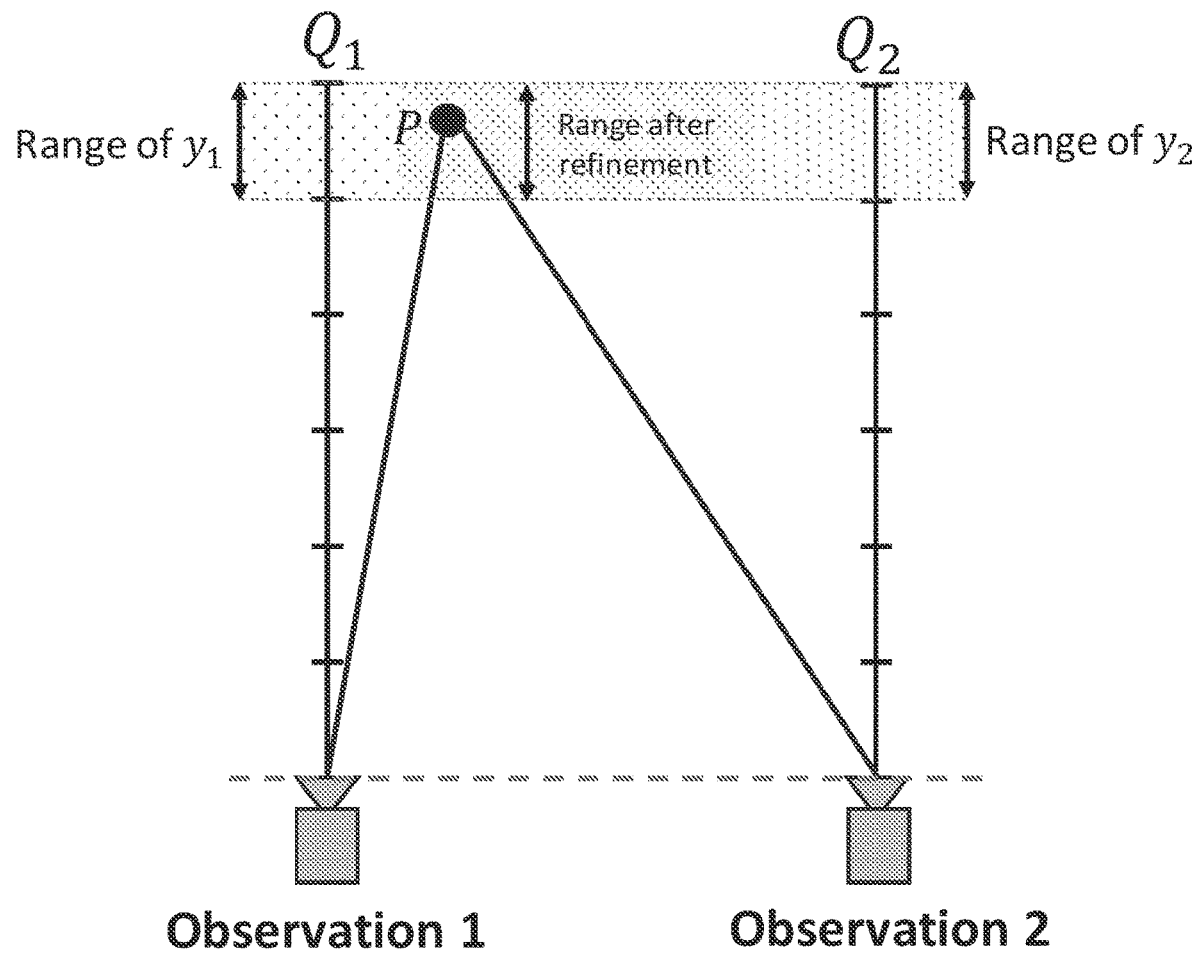
FIG. 2B is a schematic illustration showing that, when two camera views form a stereo rig, no depth refinement can be achieved if the quantization bins are well aligned.
Figure 3:
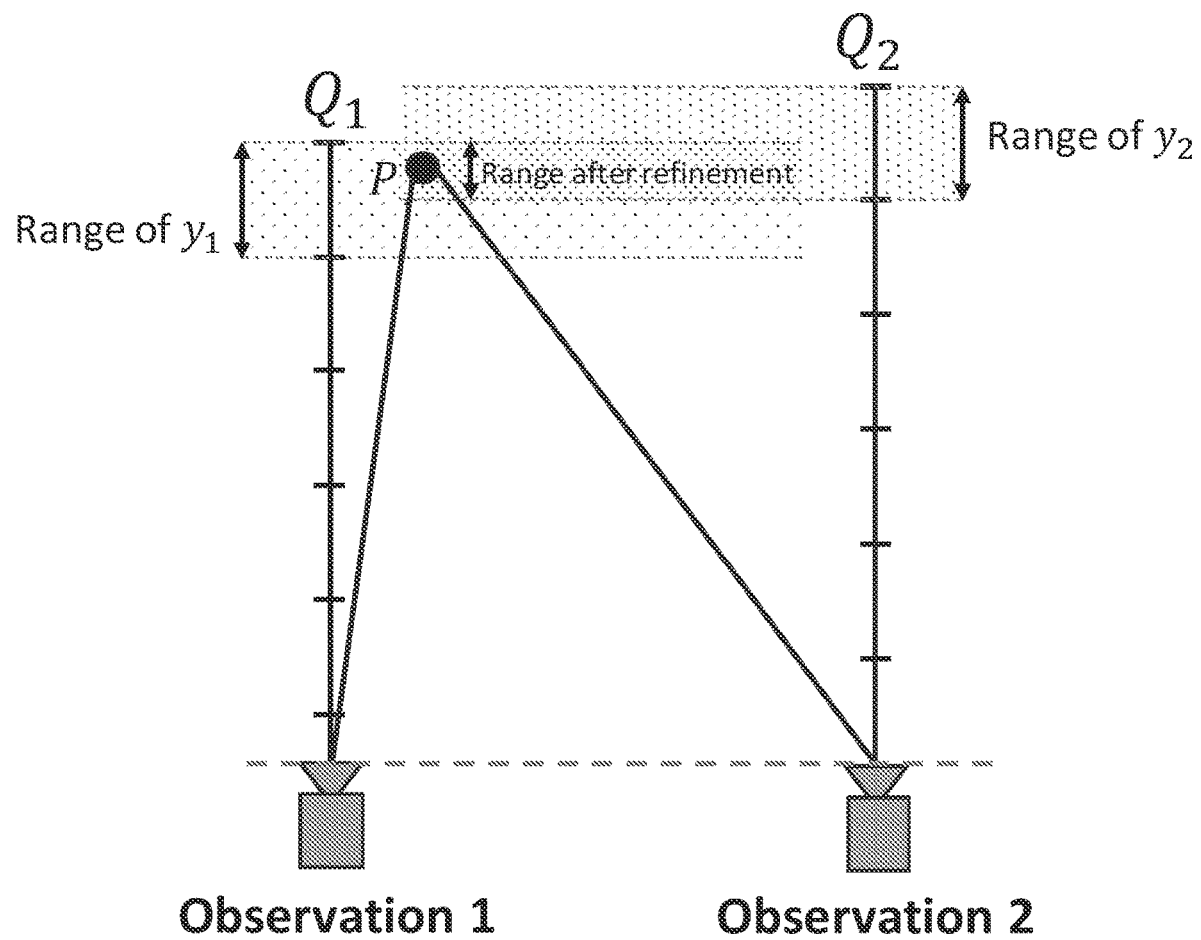
FIG. 3 is a schematic illustration showing that when two cameras views form a stereo rig, shifting the quantization bins may be used to achieve depth refinement according to some embodiments.

When two cameras are used to measure a scene, they may be arranged as a stereo rig, as illustrated in FIG. 2B. In this case, when the quantizers have aligned quantization bins, taking the intersection of the uncertainty range does not lead to higher accuracy. To address this issue, some embodiments provide an option to shift the quantization bins, as shown in FIG. 3, which can narrow down the uncertainty range.

Figure 4:
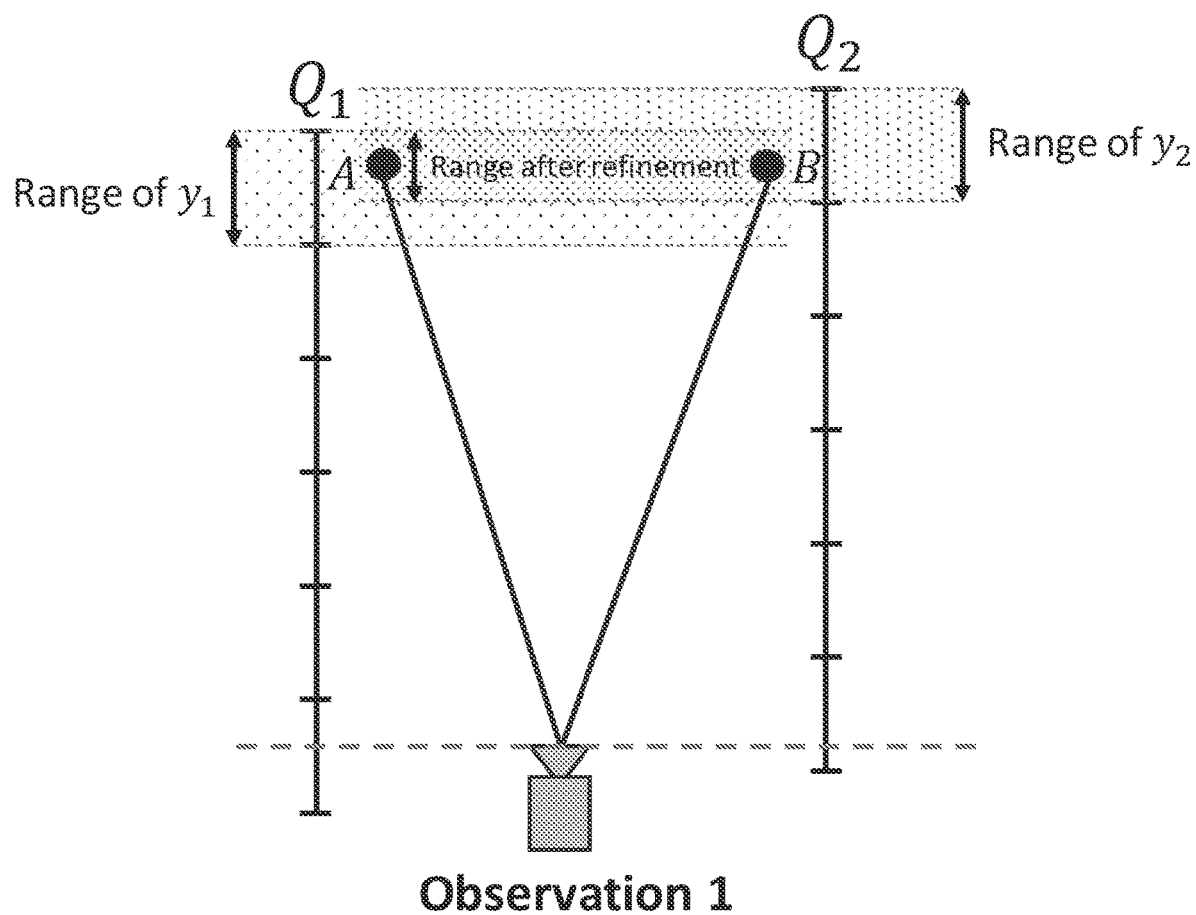
FIG. 4 is a schematic illustration showing that, within the same observation, refinement can be achieved for highly-correlated measurements when shifts are introduced to the quantization bins of individual measurement according to some embodiments.

Some embodiments do not employ multiple observations. FIG. 4 illustrates an embodiment in which only one observation is made. In this case, given that the two points A and B being measured are highly-correlated, having very similar measurements, an embodiment that operates to shift the quantization bins can be applied to these two points individually. As a result, when taking the intersection of the two uncertainty ranges, the depth precision may be enhanced.

Example embodiments may be employed with lossy point cloud compression. On the encoder side, the point cloud data (either in its original spatial domain or in a transform domain) are quantized, with the quantization bins being intentionally shifted, and the quantized signals are then encoded. Information indicating the shifts of the quantizers is available to both the encoder and decoder. For example, the encoder may signal the shifts to the decoder. On the decoder side, the point cloud data measuring the same scene may be processed by taking quantizer shifts into account. Examples of the application of such techniques for point cloud compression are described in the section "Point Cloud Compression" below.

Point Cloud Enhancement Via Multiple Observations

An embodiment for enhancing 3D point cloud data using imprecise depth measurements from two camera views is described below. The example embodiment makes use of convex optimization. While the example is described with respect to measurements from two camera views, it should be noted the that described techniques are applied on other embodiments to embodiments using three views or more.

Because 2D projections from the same 3D object onto the two image planes are related mappings of each other, example embodiments operate to enhance the quality of reconstructed 3D points by simultaneously optimizing likelihoods and priors of both views. Mathematically, signal and noise correlation in a pixel row may be modeled using graphs, which are learned using data from previous rows via a constrained $\ell$-norm minimization. A maximum a posteriori (MAP) problem may be formed, which after suitable linear approximation, results in an unconstrained convex and differentiable objective, solvable using fast gradient method (FGM).

Stereo Capturing System

Figure 5:
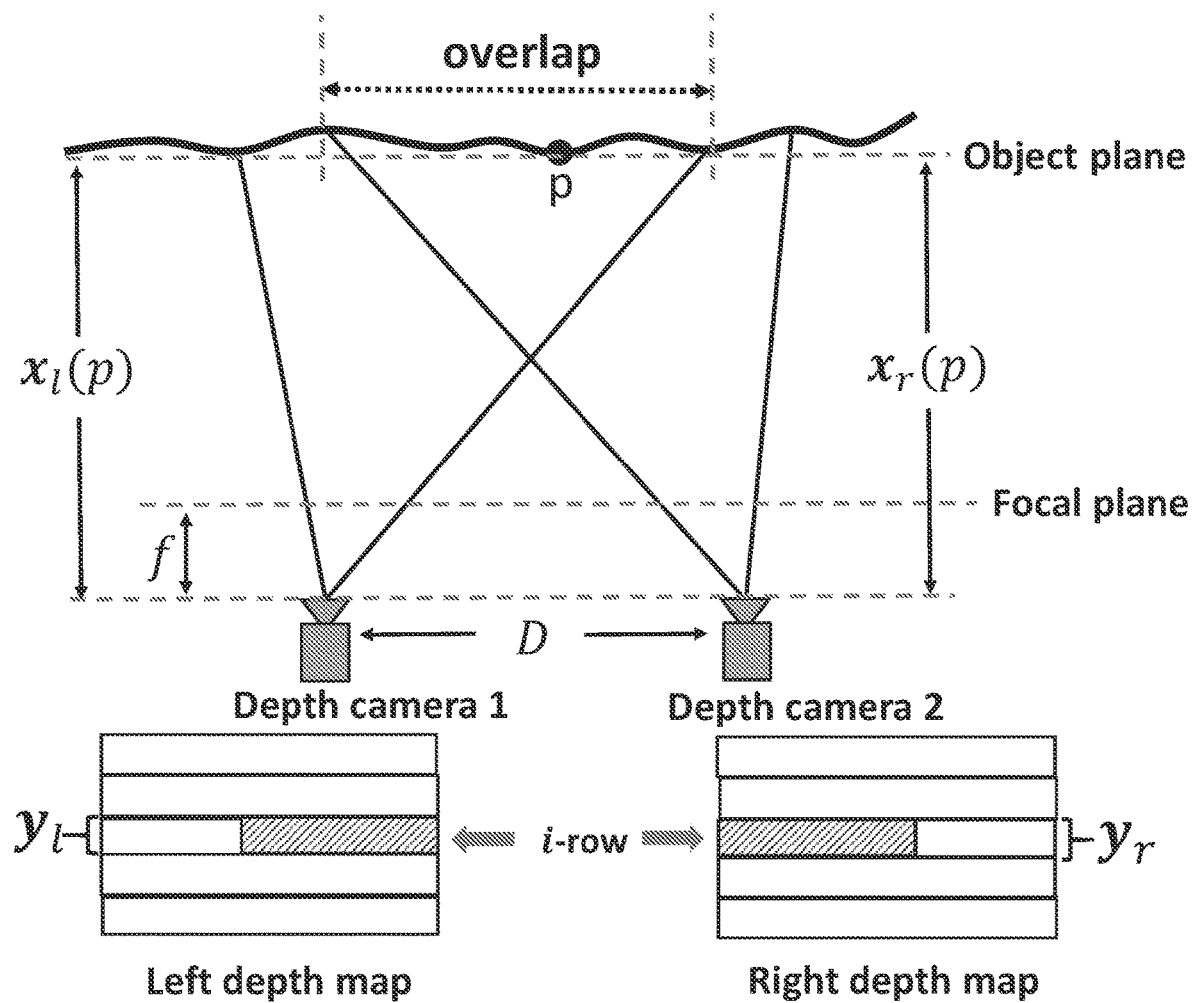
FIG. 5 shows an example of a camera system used in some embodiments.

An example embodiment uses data collected from a camera system in which the same 3D object is observed by two depth cameras from different viewpoints; specifically, there exist overlapping fields of view (FoV) from two cameras, so that there are at least two observations of the same 2D object surface. FIG. 5 illustrates a camera system as used in some embodiments. Each depth camera returns as output a depth map of size H×W and finite precision: each pixel is a noise-corrupted observation of the physical distance between the camera and the perceived 3D object, quantized to a B-bit representation.

Consider a case where the two captured depth maps are rectified, such that pixels in a row i in the left view corresponds to different pixels in the same row i in the right view. A rectification process may be performed as a pre-processing step prior to performing point cloud enhancement. Examples of rectification techniques that may be employed in some embodiments include those described in one or more of the following publications: C. Loop and Z. Zhang, "*Computing rectifying homographies for stereo vision,*" in *Proceedings, 1999 IEEE Computer Society Conference on Computer Vision and Pattern Recognition* (Cat. No PR00149), volume 1, pages 125-131, IEEE, 1999; Y.-S. Kang and Y.-S. Ho, "An efficient image rectification method for parallel multi-camera arrangement," *IEEE transactions on Consumer Electronics*, 57(3):1041-1048, 2011; and Zhengyou Zhang, "A flexible new technique for camera calibration," *IEEE Transactions on pattern analysis and machine intelligence*, 22, 2000.

Example embodiments are not restricted to the use of any particular camera poses. For more complicated cases other than a stereo rig, one can still use the measured depth maps and multiview geometry to find out the view-to-view mapping relationship.

Example Image Formation Model

In some embodiments, a 3D object is recorded by two rectified depth maps (left and right) captured by two different cameras. (Other embodiments may be implemented by extrapolating from the techniques described in this example, for example to process data collected from more than two cameras.) Denote by $y_l \in \mathbb{R}^N$ ($y_r \in \mathbb{R}^N$) an observed depth pixel row i in the left (right) view. See FIG. 5 for details. (To simplify the notation, the index i is not shown in $y_l$, $y_r$.) Observed pixels $y_l$, $y_r$ represent quantized and noise-corrupted versions of respective ground-truth signals $x_l$, $x_r$. (The quantization occurs when an input measurement is mapped to a B-bit representation.) The relationship between observation $y_l$ and ground-truth signal $x_l$ may be expressed via the following formation model:

$$y_l = \text{round}\left(\frac{x_l + \delta_l + n_l}{Q}\right)Q - \delta_l \qquad (1)$$

where $Q \in \mathbb{R}^+$ is a quantization parameter, and $n_l \in \mathbb{R}^N$ is a zero-mean additive noise. The term $\delta_l \in \mathbb{R}^N$ is a predefined vector added to $x_l$. Adding the vector $\delta_l$ to $x_l$ is equivalent to shifting the quantization bins by an amount of $-\delta_l$. This shift allows for active intervention with the measurements being made, which may provide a better chance to use the obtained measurements for enhancement, as shown in FIG. 3. Since $\delta_l$ can be absorbed into $x_l$, we neglect $\delta_l$ in the following derivation, with the understanding that $\delta_l$ will be subtracted from the refinement results in the end. The same formation process may be applied to the measurements of the right camera, $y_r$. Example embodiments operate to estimate the ground-truths $X = \{x_l, x_r\}$ given observation $Y = \{y_l, y_r\}$. The estimate is denoted with $\tilde{X} = \{\tilde{x}_l, \tilde{x}_r\}$.

View-to-View Mapping

Pixel row i of the rectified left and right views, $x_l$ and $x_r$, are projected from the same 3D object onto two different camera planes, and thus are related. Consider a use case in which there is no occlusion when projecting a 3D object to the two camera views. A 1D warping procedure may be performed to relate $x_l$ and $x_r$. The warping procedure may a warping procedure as described in one or more of the following publications: D. Scharstein and R. Szeliski, "High-accuracy stereo depth maps using structured light," in 2003 *IEEE Computer Society Conference on Computer Vision and Pattern Recognition, 2003, Proceedings,* volume 1, pages I-I, IEEE, 2003; and J. Jin, A. Wang, Y. Zhao, C. Lin, and B. Zeng, "Region-aware 3-D warping for DIBR. *IEEE Transactions on Multimedia,* 18(6):953-966, 2016. For the j-th pixel in the left view, $x_{l,j}$, its horizontal position $s(j, x_{l,j})$ in the right view after projection is $$s(j, x_{l,j}) = j - d(x_{l,j}) \qquad (2)$$

$$d(x_{l,j}) = \frac{fD}{x_{l,j}}$$

where d is the (non-integer) disparity, f is the camera focal length, and D is the baseline that represent the distance between left and right views. Note that s is a function of both left pixel position j and value $x_{l,j}$.

Assuming that the object surface is smooth, we interpolate right pixels $x_r$ given left pixels $x_l$ as $$x_r = Wx_l = g(x_l) \quad (3)$$

where $W \in \mathbb{R}^{N \times N}$ is a weight matrix with elements $\omega_{ij}$. In particular, the weight $\omega_{ij}$ between $x_{r,i}$ and $x_{l,j}$ may be modeled as $$\omega_{ij} = \frac{1}{\sum_{m=1}^{N} \exp\left(-\frac{(s(m, x_{l,m}) - i)^2}{\sigma_s^2}\right)} \exp\left(-\frac{(s(j, x_{l,j}) - i)^2}{\sigma_s^2}\right) \quad (4)$$

In this example, weight $\omega_{ij}$ is larger if the distance between the projected position $s(j, x_{l,j})$ of pixel j in $x_{l,j}$ and the target pixel position i in $x_r$ is small.

Equation (4) may be simplified by using a normalization constant $$C_i = 1 / \sum_{m=1}^{N} \exp\left(-\frac{(s(m, x_{l,m}) - i)^2}{\sigma_s^2}\right)$$

Combining with (2), (4) may be rewritten as $$\omega_{ij} = C_i \exp\left(-\frac{(j - fDx_{l,j}^{-1} - i)^2}{\sigma_s^2}\right) \quad (5)$$

Since $g(x_l)$ is differentiable, a first-order Taylor series expansion may be defined around $x_l = x_l^0$ to get a linear approximation, where $x_l^0$ is the first estimate. Thus, $$g(x_l) \approx g(x_l^0) + g'(x_l^0)(x_l - x_l^0) = Hx_l + d \quad (6)$$

where $H = g'(x_l^0)$ is the first-order derivative of $g(x_l)$ at $x_l = x_l^0$, and
$d = g(x_l^0) - g'(x_l^0)x_l^0$ is a constant vector.

Likelihood Term and Signal Prior

Example embodiments operate under an assumption that the zero-mean additive noise $n_l \in \mathbb{R}^N$ follows a jointly Gaussian distribution, with a probability density function (PDF) of $n_l$ being $$Pr(n_l) = \exp\left(-\frac{n_l^\top P_l n_l}{\sigma_n^2}\right) \quad (7)$$

where P is a positive definite (PD) precision matrix, and $\sigma_n^2$ is the noise variance. Given observation $y_l$, the likelihood term $Pr(y_l|x_l)$ is $$Pr(y_l|x_l) = \int_{\mathcal{R}_l} Pr(n_l) dn_l$$

where the region $\mathcal{R}_l$ over which the integration (8) is performed is $$\mathcal{R}_l = \left\{ n_{l,i} \,\Big|\, y_{l,i} - \frac{Q}{2} < x_{l,i} + n_{l,i} < y_{l,i} + \frac{Q}{2} \right\}, \quad (9)$$

which is the quantization bin associated with $y_{l,i}$. In this example, the noise terms $n_l$ and $n_r$ are assumed to be independent.

Figure 6:
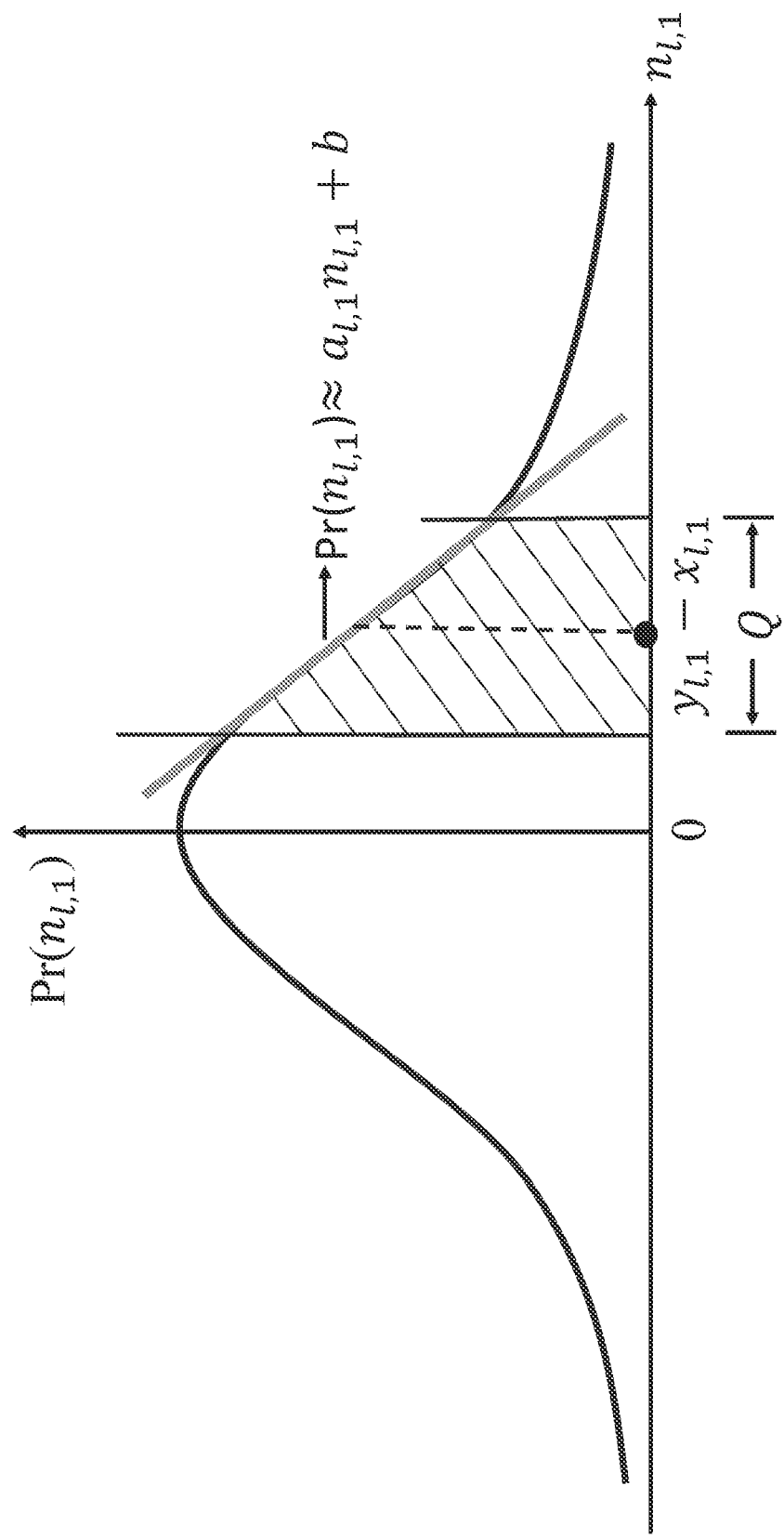
FIG. 6 shows an example of using a linear approximation of a Gaussian distribution.

The integration in (8) over a jointly Gaussian PDF is non-trivial. However, $Pr(n_l)$ may be approximated over the region $\mathcal{R}_l$ as an affine function $$Pr(n_l) \approx a^T n_l + b \quad (10)$$

where $a \in \mathbb{R}^N$ and $b \in \mathbb{R}$ are constants that can be computed via Taylor series expansion at $y_l - x_l$ given (7). A one-dimensional example is shown in FIG. 6 for purposes of illustration. Equation (8) may then be expressed as $$Pr(y_l|x_l) \approx \int_{\mathcal{R}_l} (a^\top n_l + b) dn_l \quad (11)$$

$$= Q^N (a^\top (y_l - x_l) + b) \quad (12)$$

Equipped with the likelihood term in a linear form, now let us turn to the signal prior to formulating the MAP problem. It has been observed that depth maps are piecewise smooth (PWS). We assume that the previous K rows have been reconstructed and that the next pixel row i follows a similar image structure. In this example we choose to use the graph Laplacian regularizer as a signal prior, for example using techniques as described in Gene Cheung, Enrico Magli, Yuichi Tanaka, and Michael K Ng, "Graph spectral image processing," *Proceedings of the IEEE*, 106(5):907-930, 2018. The use of a Laplacian regularizer gives effect to an assumption that the signal $x_l$ should be smooth with respect to some graph G (with associated graph Laplacian matrix denoted as $L_l$), such that the term $x_l^T L_l x_l$ is small. In this example, the prior for the left row $x_l$ may be expressed as $$Pr(x_l) = \exp\left(-\frac{x_l^\top L_l x_l}{\sigma^2}\right). \quad (13)$$

In this example, we do not limit the construction of the graph G. One may build up a proper graph based on the previously reconstructed results or the current corrupted measurements $y_l$. Other embodiments may use other techniques for determining a prior $Pr(x_l)$. In some such embodiments, the value of $Pr(x_l)$ increases for increasing levels of smoothness (or piecewise smoothness) of $x_l$, where the smoothness may be represented using one or more different techniques.

Maximum a Posteriori (MAP) Formulation

In some embodiments, a MAP problem is formulated to obtain the estimate $\tilde{X} = \{\tilde{x}_l, \tilde{x}_r\}$ as follows.

$$\tilde{X} = \arg\max_{x_l, x_r} Pr(y_l, y_r | x_l, x_r) Pr(x_l, x_r) \quad (14)$$

$$= PR(y_l, y_r | x_l, g(x_l)) Pr(x_l, g(x_l)) \quad (15)$$

$$= PR(y_l | x_l) Pr(y_r | g(x_l)) Pr(x_l) Pr(g(x_l)) \quad (16)$$

$$\approx Q^{2N}(a^\top(y_l - x_l) + b) \quad (17)$$

$$(a^\top(y_r - g(x_l)) + b) \exp\left(-\frac{x_l^\top L_l x_l}{\sigma^2}\right) \exp\left(-\frac{g(x_l)^\top L_r g(x_l)}{\sigma^2}\right)$$

where in (15) we substituted $g(x_l)$ for $x_r$ and in (16) we split up the first term since left and right noise, $n_l$ and $n_r$, are independent.

To ease optimization, we minimize the negative log of (17) instead:

$$x_l = \arg\min_{x_1} -\ln(a^\top(y_l - x_l) + b) - \ln(a^\top(y_r - g(x_l)) + b) + \quad (18)$$
$$x_l^\top L_l x_l + g(x_l)^\top L_r g(x_l)$$
$$= -\ln(a^\top(y_l - x_l) + b) - \ln(a^\top(y_r - (Hx_l + d)) + b) + \quad (19)$$
$$x_l^\top L_l x_l + x_l^\top H^\top L_r H x_l + 2d^\top L_r H x_l + d^\top L_r d$$

Formulation (19) is an unconstrained convex and differentiable objective; it can be solved using a gradient descent method. When the above formulation (19) is applied, it is not necessary to limit the choices of the Laplacian matrix and the method to estimate the noise parameters. After (19) has been solved, the quantizer shifts $\delta_l$ may be subtracted from the estimate $\tilde{x}_l$. In some embodiments, the vector $g(\tilde{x}_l)$ may be used as the estimate $\tilde{x}_r$. In other embodiments, the estimate $\tilde{x}_r$ may obtained by performing the methods described above while reversing the subscripts l and r.

In some embodiments, refinement can be performed using more than two measurements. For example, some embodiments may employ a set of K measurements (e.g. from K different camera positions). A set of functions $g_i(\bullet)$ may be defined such to map measurements from a reference view $x_1$ to any other measurement $x_i$ (i≥2) according to the equation $x_i = g_i(x_1)$. Refined point cloud data $\tilde{x}_1$ may be generated in some embodiments according to Eq. 20:

$$\tilde{x}_1 = \arg\max_{x_1} Pr(y_1|x_1)Pr(x_1)\prod_{i=2}^{K} Pr(y_i|g_i(x_1))Pr(g_i(x_1)) \quad (20)$$

In some embodiments, Eq. (20) may be formulated using first-order approximations according to the procedure indicated in Eqs. (17), (18), and (19), leading to an unconstrained convex optimization problem which can be solved efficiently.

Point Cloud Compression

Using systems and methods as described above, example embodiments are used to enhance the precision of 3D point cloud data during acquisition. Further embodiments employ such systems and methods in performing lossy point cloud compression (PCC).

In PCC, quantization is generally performed. Quantization for PCC has effects that are similar to those of quantization performed during acquisition. As noted above, the operation of shifting quantization bins is analogous to adding a pre-designed quantity to the point cloud signal being encoded.

Figure 7:
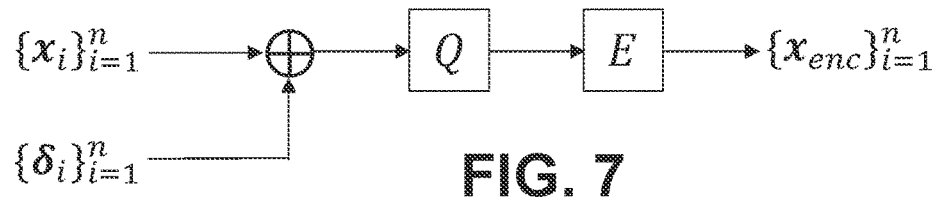
FIG. 7 is a block diagram of an example encoder for point cloud compression used in some embodiments.

FIG. 7 is a functional block diagram of an example point cloud encoder. In FIG. 7, $\{x_i\}_{i=1}^n$ denotes the n frames of point cloud data to be encoded. The data can be in its original spatial domain or in a transform domain. The module Q represents the quantizer while E represents an encoder module which may consist of entropy coding or other post-processing steps such as channel coding. The quantities $\{\delta_i\}_{i=1}^n$ may be predefined and are added to the point cloud data before quantization. Adding this quantity to $\{x_i\}_{i=1}^n$ is analogous to shifting the quantization bins of Q by $\{-\delta_i\}_{i=1}^n$. The addition of $\{\delta_i\}_{i=1}^n$ may be referred to as quantization shifts. The quantity $\{\delta_i\}_{i=1}^n$ is known by both the encoder and the decoder, analogous to a quantization table. The output of the encoder is denoted as $\{x_{enc}\}_{i=1}^n$.

Figure 8:
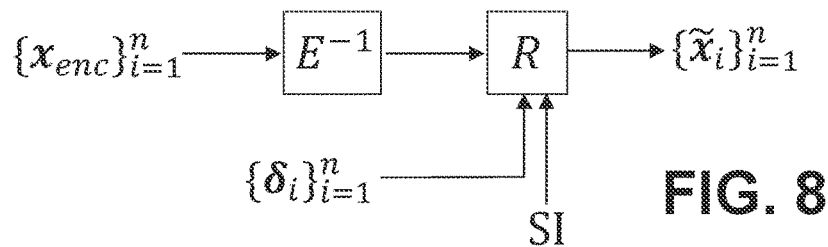
FIG. 8 is a block diagram of a decoder using joint refinement according to some embodiments.
Figure 9:
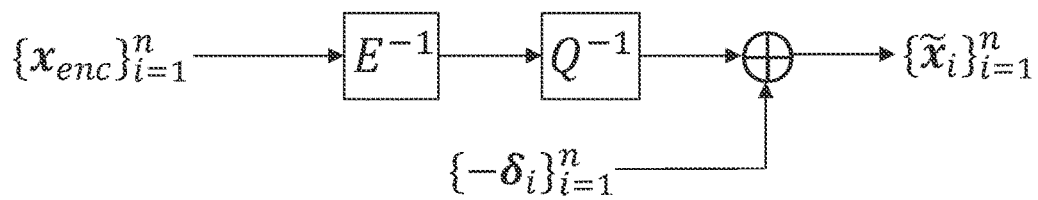
FIG. 9 is a block diagram of a decoder when refinement is not applied according to some embodiments.

At the decoder side, after the encoded point cloud $\{x_{enc}\}_{i=1}^n$ is received, the user may be given the option to decode it with refinement (FIG. 8) or without refinement (FIG. 9). FIG. 9 shows a case where refinement is not applied. In this case, the encoded point cloud $\{x_{enc}\}_{i=1}^n$ is initially decoded by applying the inverse operation of E (denoted as $E^{-1}$). It is then dequantized with $Q^{-1}$. After that, since quantization shifts $\{\delta_i\}_{i=1}^n$ were added to the point cloud signal during encoding, those quantization shifts are subtracted to obtain the final decoded signal $\{\tilde{x}_i\}_{i=1}^n$. In this decoding embodiment, the computational cost is relatively low though there is no gain in terms of precision.

When refinement is applied in the decoding stage, as illustrated in FIG. 8, $\{x_{enc}\}_{i=1}^n$ is initially decoded by $E^{-1}$. After that, the correlated frames within $\{x_{enc}\}_{i=1}^n$ (and/or correlated regions in any one frame of $\{x_{enc}\}_{i=1}^n$) are jointly refined by considering their correlations via multiview geometry. In some embodiments, extra side information (SI), such as camera parameters, and the quantization shifts $\{x_{enc}\}_{i=1}^n$ are also employed. The SI here may be provided using any of various different techniques or in various different syntax elements, such as in a sequence parameter set, a picture parameter set, or a supplemental enhancement information message. The application of quantization shifts and any side information is denoted by the module R in FIG. 8, and its output may be the final decoded point cloud $\{x_{enc}\}_{i=1}^n$. The module R may employ a MAP formulation to refine a pixel row $x_l$ and $x_r$ as shown in (19), which takes both the effect of noise and quantization into account.

Figure 10:
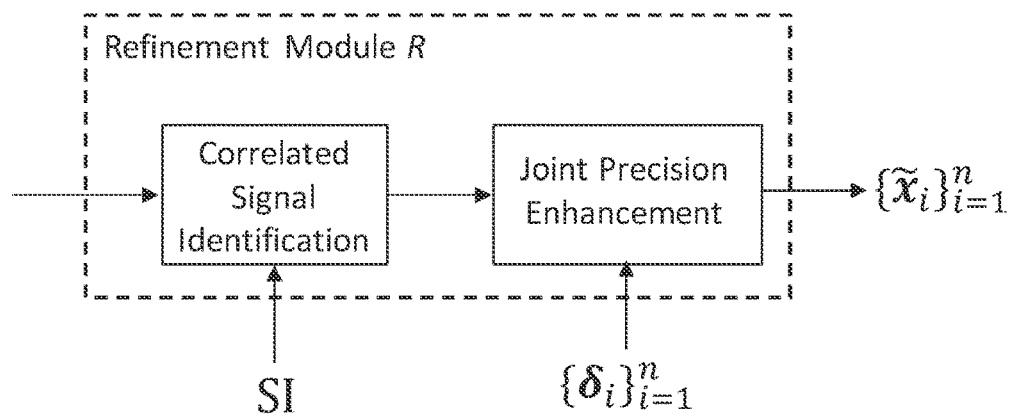
FIG. 10 is a block diagram illustrating components of a refinement module of a decoder according to some embodiments.

In some embodiments, the module R of FIG. 8 may be implemented using components as shown in FIG. 10. One module performs identification of correlated signals. This module may operate to identify the correlated frames or correlated regions in the input point cloud data. One example is the view mapping in stereo cameras as described above. This step may make use of extra side information like camera parameters and pose information. Another module illustrated in FIG. 10 may perform joint precision enhancement. The precision enhancement may include combining both quantization shifts $\{-\delta_i\}_{i=1}^n$ and the correlated observations in the point cloud data to generate more precise depth measurements. This step may be performed based on different procedures, such as optimization using the formulation (19) does, or joint filtering of the point cloud data, among other possibilities.

In some cases, the quantization shifts $\delta_i$ may be set to be zero. In such cases, applying refinement R (FIG. 8) may still provide depth measurements of higher precision, as long as multiple observations in different point cloud frames can be identified. For example, with reference to the illustration of FIG. 2A, in which the two camera viewpoints are not parallel, the precision can be increased by taking the intersection of the uncertainty ranges of the two measurements.

In some embodiments, encoding and decoding of point cloud data may proceed as follows. A first parameter $x_1$ is obtained for point in a first point cloud and a second parameter $x_2$ is obtained for a point in a second point cloud. The parameters $x_1$ and $x_2$ may both be depth values, for example, or they may be other types values (e.g. representing horizontal or vertical positions). The parameters $x_1$ and $x_2$ are correlated, for example they may represent the same or nearby points on a surface of an object with values that are captured by the same or different camera at the same or different times.

In some embodiments, these parameters $x_1$ and $x_2$ are quantized to values $y_1$ and $y_2$ by a method that includes addition of quantizer shifts $\delta_1$ and $\delta_2$. For example, with a quantization step of 1, the parameters $x_1$ and $x_2$ may be quantized as follows:

$$y_1 = \text{round}(x_1 + \delta_1)$$

$$y_2 = \text{round}(x_2 + \delta_2)$$

Quantization steps of sizes other than 1 may be used, and the steps need not be the same for the two parameters. In some embodiments, one of the shifts ($\delta_1$ or $\delta_2$) may be zero. In some embodiments the same shift $\delta_1$ may be used for all points in the first point cloud and the same shift $\delta_2$ may be used for all points in the second point cloud; in other embodiments, different quantizer shifts may be used for different points (or for different parameters) within a point cloud.

Once the quantized point cloud parameters $y_1$ and $y_2$ have been obtained, they may be encoded, e.g. into a bitstream for storage and/or transmission to a decoder. In some embodiments, the quantizer shifts $\delta_1$ and $\delta_2$ may also be encoded into the bitstream. In some embodiments, the quantizer shifts $\delta_1$ and $\delta_2$ may be provided separately to a decoder, for example in one or more supplemental enhancement information messages.

At a decoder, according to some embodiments, the point cloud parameters $y_1$ and $y_2$ and the quantizer shifts $\delta_1$ and $\delta_2$ are obtained. For example, the parameters $y_1$ and $y_2$ may be received in an encoded form and may be decoded by the decoder.

Given the information provided to the decoder, the following upper and bounds may be considered to apply to shifted parameters $(x_1+\delta_1)$ and $(x_2+\delta_2)$:

$$y_1 - \frac{1}{2} \le (x_1 + \delta_1) < y_1 + \frac{1}{2}$$

$$y_2 - \frac{1}{2} \le (x_2 + \delta_2) < y_2 + \frac{1}{2}$$

with adjustment as appropriate for different quantization techniques (e.g. quantization step sizes other than 1). Using subtraction based on the quantization shifts, it follows that the following upper and lower bounds apply to the original parameters $x_1$ and $x_2$:

$$y_1 - \frac{1}{2} - \delta_1 \le x_1 < y_1 + \frac{1}{2} - \delta_1$$

$$y_2 - \frac{1}{2} - \delta_2 \le x_2 < y_2 + \frac{1}{2} - \delta_2$$

The first quantization range may correspond, for example, to the "Range of $y_1$" illustrated in FIG. 3 or FIG. 4, and the second quantization range may correspond, for example, to the "Range of $y_2$" of the same figures. In some embodiments, refined point cloud data is obtained by selecting point cloud data (e.g. a parameter $\tilde{x}$) in a region where these ranges overlap. Such a region may correspond, for example to the "Range after refinement" illustrated in FIG. 3 or FIG. 4. Depending on which range is higher, the overlapping range is be $$y_1 - \frac{1}{2} - \delta_1 \le \tilde{x} < y_2 + \frac{1}{2} - \delta_2$$

or $$y_2 - \frac{1}{2} - \delta_2 \le \tilde{x} < y_1 + \frac{1}{2} - \delta_1$$

In some embodiments, the selection of a refined point cloud parameter $\tilde{x}$ may be performed such that the parameter $\tilde{x}$ falls within the overlapping range (in the quantization range of both $y_1$ and $y_2$). The midpoint of the overlapping range is obtained using subtraction based on the quantization shifts as $(y_1+y_2-\delta_1-\delta_2)/2$. In some embodiments, the refined parameter $\tilde{x}$ may be selected to be equal to the midpoint, such that $$\tilde{x} = (y_1 + y_2 - \delta_1 - \delta_2)/2$$

In some embodiments, the decoder may refine the received point cloud data using one or more of a variety of techniques, including but not limited to the maximum a priori (MAP) refinement described above.

An example decoding method is illustrated in FIG. 14. In the example decoding method, data representing at least a first point cloud and a second point cloud is obtained (1402). Information identifying at least a first set of quantizer shifts associated with the first point cloud is obtained (1404). In the first set of quantizer shifts, the shifts may be the same for different points or different parameters, or they may be different for different points or different parameters. Refined point cloud data is obtained (1406) based on the first point cloud and the second point cloud, where obtaining the refined point cloud data includes performing a subtraction based on at least the first set of quantizer shifts.

An example encoding method is illustrated in FIG. 15. In the example encoding method, data representing at least a first point cloud and a second point cloud is obtained (1502). The first point cloud and the second point cloud are quantized (1504) by a method comprising adding a first set of quantizer shifts to the first point cloud. The quantized first and second point clouds and information indicating the first set of quantizer shifts are encoded in a bitstream (1506).

Example Applications

Various embodiments using PCC include the following.

Some embodiments are used with inter-frame coding. When a frame from a point cloud video is encoded using the other frames, some embodiments jointly consider the quantization shifts and the other assisting frames before or after this current frame which have observed the same scene. Information from other frames may be used to increase the precision of the reconstruction at the decoder.

Some embodiments are used with intra-frame coding. When a frame from a point cloud video is encoded individually, some embodiments consider the introduced quantization shifts and the highly correlated regions in the same point cloud frame to increase the precision of the reconstruction.

Some embodiments are used with octree-based point cloud compression. When octree is employed as the coding structure of a point cloud, example embodiment operate to actively construct different tree roots with small quantization shifts. Then the decoder may perform reconstruction and optimization, whether a frame is encoded as an inter-frame or an intra-frame.

Some embodiments are used with transform coding. When transform coding is used and quantization is applied to the transform coefficients, some embodiments operate to perform precision enhancement in the transformed domain where the transform coefficients are to be optimized.

Additional Embodiments and Information

In some embodiments, a point cloud decoding method includes: receiving initial first point cloud data ($y_i$) and at least initial second point cloud data $(y_r)$; and selecting refined first point cloud data $(x_l)$ to substantially maximize a product of factors comprising one or more of the following: a conditional probability $Pr(y_l|x_l)$ of the initial first point cloud data $(y_l)$ given the refined first point cloud data $(x_l)$, a conditional probability $Pr(y_r|g(x_l))$ of the initial second point cloud data $(y_r)$ given an estimate $g(x_l)$ of refined second point cloud data $(x_r)$, where the estimate $g(x_l)$ is based on the refined first point cloud data $(x_l)$, a prior probability $Pr(x_l)$ of the refined first point cloud data $(x_l)$, and a prior probability $Pr(g(x_l))$ of the estimate $g(x_l)$ of refined second point cloud data $(x_r)$.

Some such embodiments include, after selecting the refined first point cloud data $(x_l)$, subtracting a quantizer shift $\delta_l$ from the refined first point cloud data.

In some embodiments, selecting the refined first point cloud data $(x_l)$ is performed iteratively.

In some embodiments, selecting the refined first point cloud data $(x_l)$ to substantially maximize the product of the factors comprises selecting the refined first point cloud data $(x_l)$ to substantially minimize a sum of negative logarithms of the factors.

In some embodiments, selecting the refined first point cloud data $(x_l)$ to substantially minimize a sum of negative logarithms of the factors is performed using a gradient descent method.

In some embodiments, the conditional probability $Pr(y_l|x_l)$ of the initial first point cloud data $(y_l)$ given the refined first point cloud data $(x_l)$ is represented by a linear function of a difference between the initial first point cloud data $(y_l)$ and the refined first point cloud data $(x_l)$.

In some embodiments, the estimate $g(x_l)$ of refined second point cloud data $(x_r)$ is a linear function of the refined second point cloud data $(x_r)$.

In some embodiments, the conditional probability $Pr(y_r|g(x_l))$ of the initial second point cloud data $(y_r)$ given the estimate $g(x_l)$ of refined second point cloud data $(x_r)$ is represented by a linear function of a difference between the initial second point cloud data $(y_r)$ and the estimate $g(x_l)$ of refined second point cloud data $(x_r)$.

In some embodiments, the prior probability $Pr(x_l)$ of the refined first point cloud data $(x_l)$ is represented by $\exp(-x_l^T L_l x_l / \sigma^2)$, where $L_l$ is a graph Laplacian matrix.

In some embodiments, the prior probability $Pr(g(x_l))$ of the estimate $g(x_l)$ of refined second point cloud data $(x_r)$ is represented by $\exp(-g(x_l)^T L_r g(x_l)/\sigma^2)$, where $L_r$ is a graph Laplacian matrix.

A method according to some embodiments includes: receiving first point cloud data and at least second point cloud data; and refining the first point cloud data using at least the second point cloud data.

Some such embodiments further include, after refining the first point cloud data, subtracting a quantizer shift from the refined first point cloud data. In some embodiments, the quantizer shift is a predetermined quantizer shift.

An encoding method according to some embodiments includes: receiving initial first point cloud data and at least initial second point cloud data; processing the initial first and second point cloud data by a method comprising adding a first set of quantizer shifts $\delta_1$ to the first point cloud data; and encoding the processed first and second point cloud data.

In some embodiments, processing the initial first and second point cloud data further comprises adding a second set of quantizer shifts $\delta_2$ to the second point cloud data.

In some embodiments, the first set of quantizer shifts $\delta_1$ is different from the second set of quantizer shifts $\delta_2$.

Some embodiments further include providing information identifying at least one of (i) the first set of quantizer shifts $\delta_1$ or (ii) the second set of quantizer shifts $\delta_2$ along with the encoded first and second point cloud data.

A decoding method according to some embodiments includes receiving encoded first point cloud data and at least encoded second point cloud data; receiving information identifying at least a first set of quantizer shifts $\delta_1$; decoding the first point cloud data and at least the second point cloud data; refining the decoded first point cloud data using the decoded second point cloud data; and subtracting the first set of quantizer shifts $\delta_1$ from the first point cloud data.

An apparatus according to some embodiments includes a processor configured to perform at least a method according to any of the processes described herein.

An apparatus according to some embodiments includes a processor and a computer-readable medium storing instructions operative to perform at least a method according to any of the processes described herein. In some such embodiments, the computer-readable medium is a non-transitory computer-readable medium.

Some embodiments include a computer-readable medium storing point cloud data encoded using any of the methods described herein. In some such embodiments, the computer-readable medium is a non-transitory computer-readable medium.

This specification describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the present disclosure or the scope of those aspects. Indeed, all of the different aspects can be combined and interchanged to provide further aspects. Moreover, the aspects can be combined and interchanged with aspects described in earlier filings as well.

Figure 11:
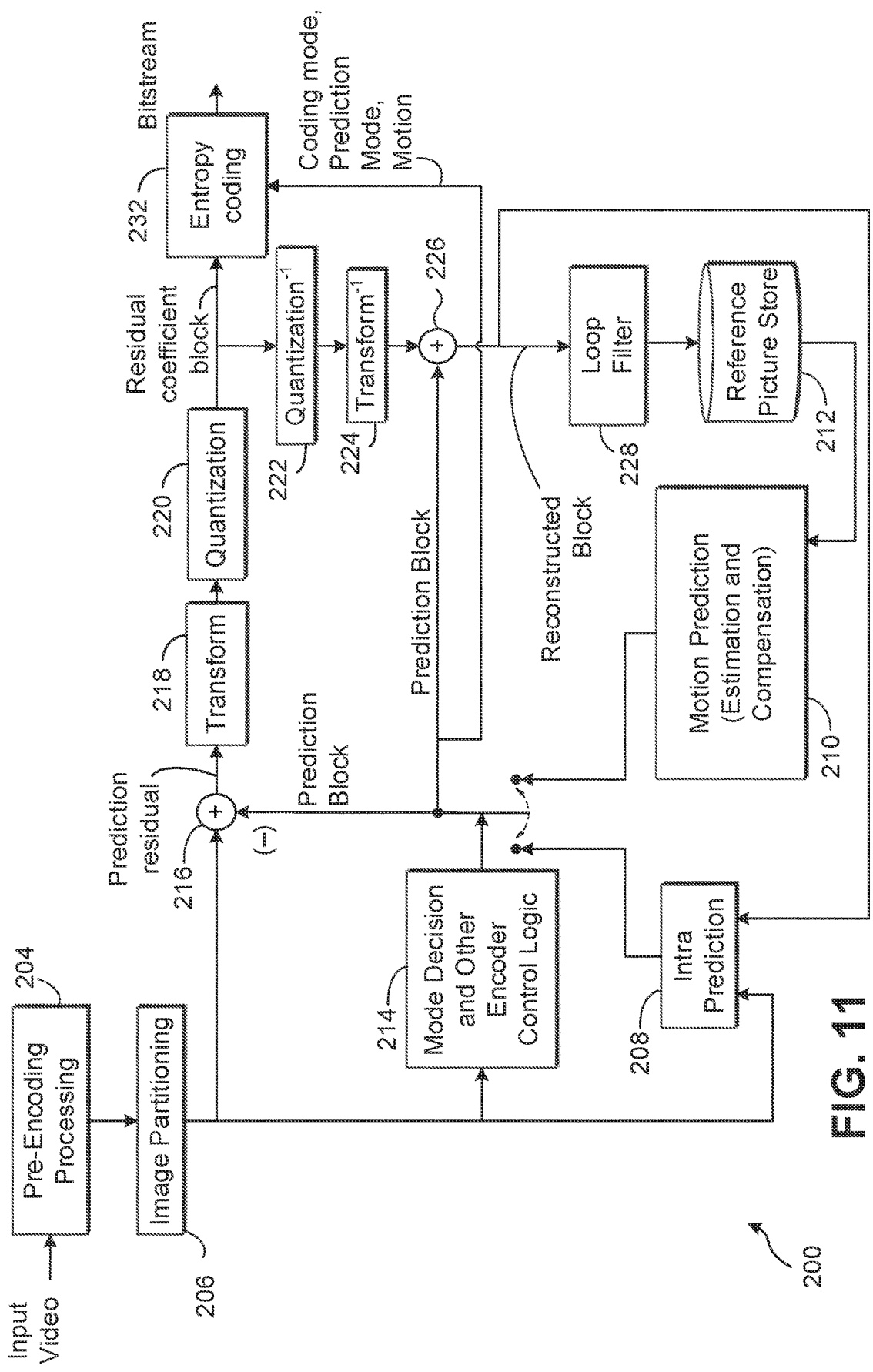
FIG. 11 is a block diagram of a video encoder used in some embodiments.
Figure 12:
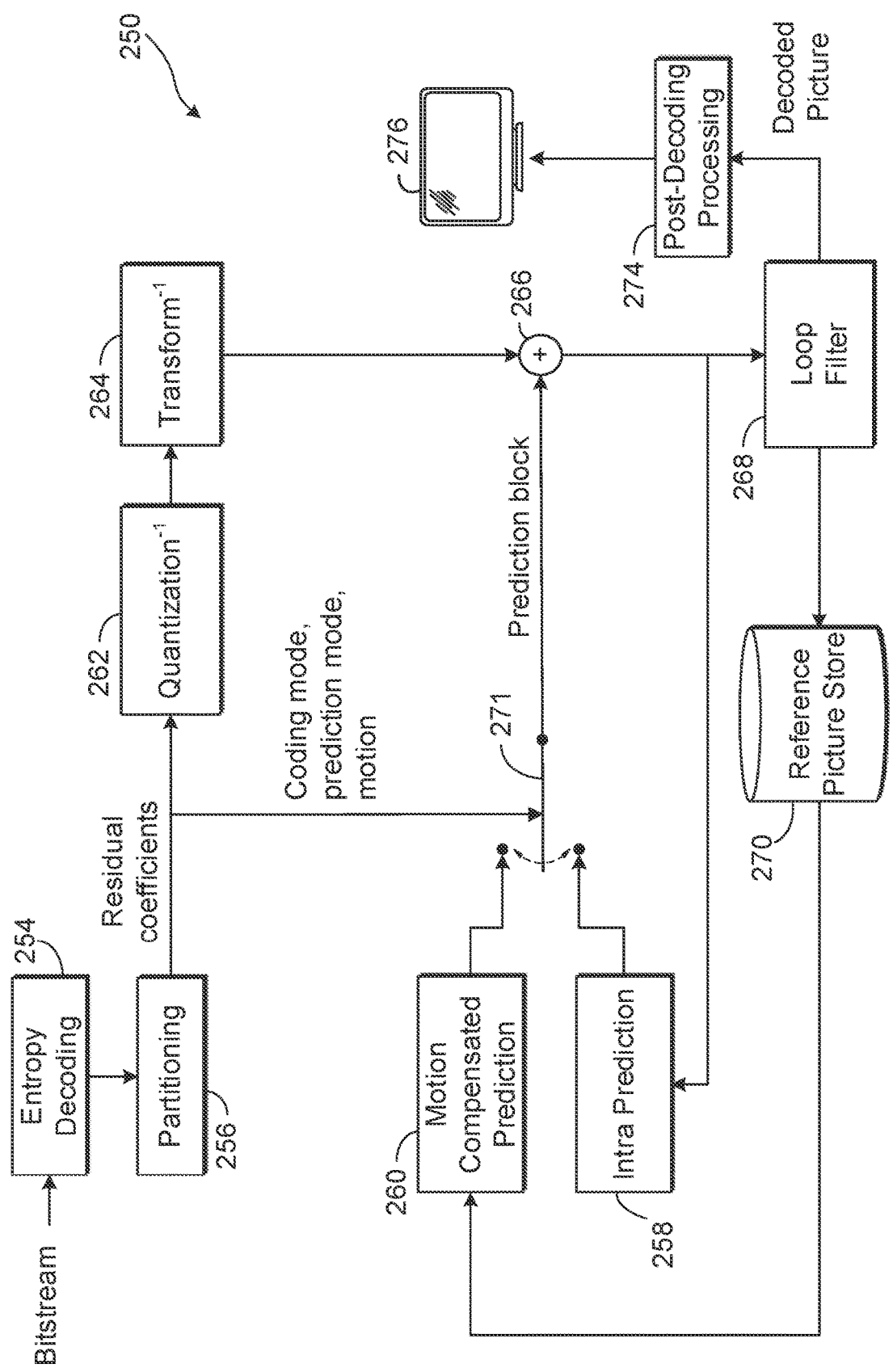
FIG. 12 is a block diagram of a video decoder used in some embodiments.
Figure 13:
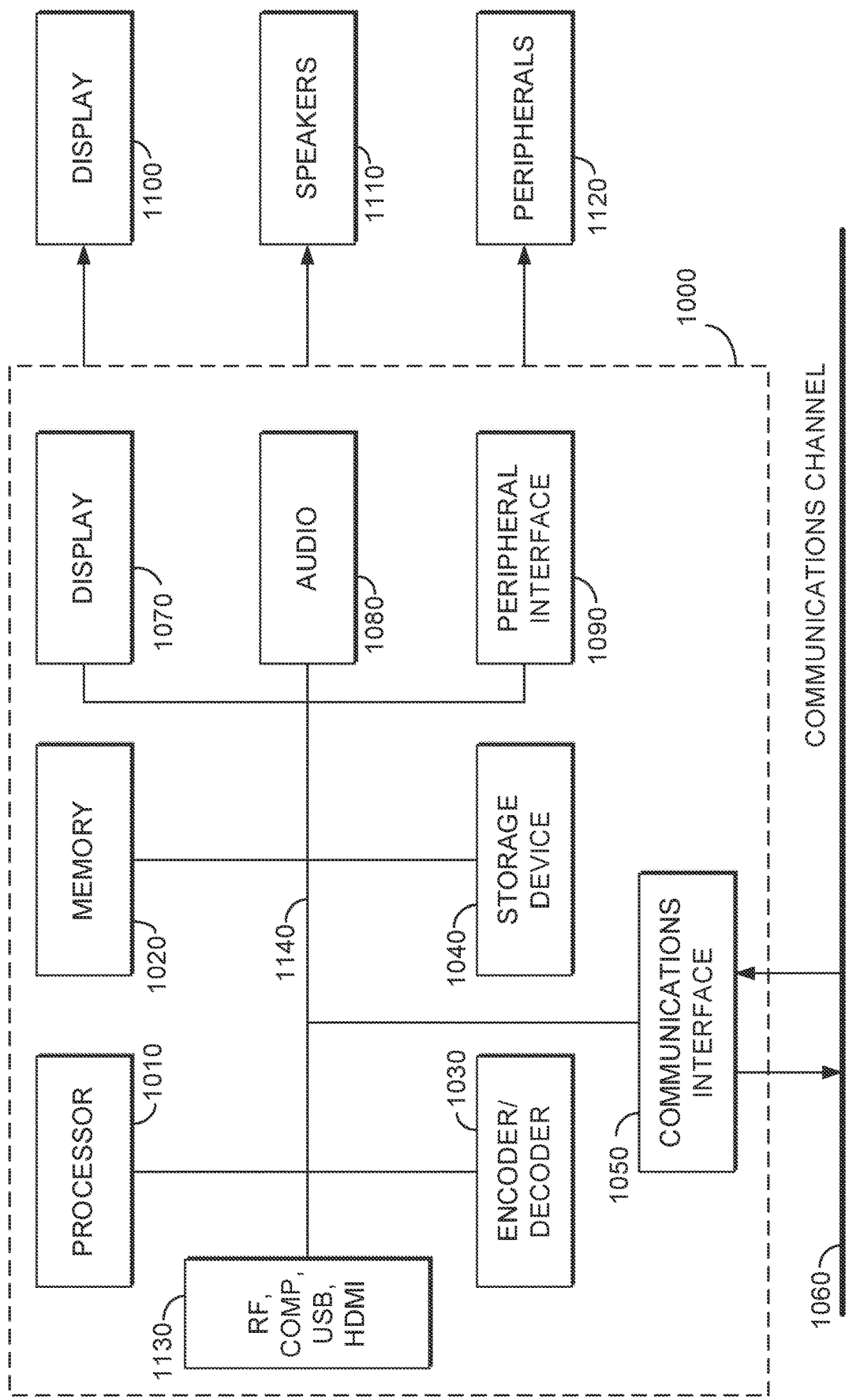
FIG. 13 is a block diagram of an example of a system in which various aspects and embodiments are implemented.

The aspects described and contemplated in this disclosure can be implemented in many different forms. FIGS. 11, 12, and 13 below provide some embodiments, but other embodiments are contemplated and the discussion of FIGS. 11, 12, and 13 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present disclosure, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding".

Use of such terms does not imply an ordering to the modified operations unless specifically required. So, in this example, the first decoding need not be performed before the second decoding, and may occur, for example, before, during, or in an overlapping time period with the second decoding.

Various methods and other aspects described in this disclosure can be used to modify modules, for example, the intra prediction, entropy coding, and/or decoding modules (160, 360, 145, 330), of a video encoder 100 and decoder 200 as shown in FIG. 11 and FIG. 12. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this disclosure can be used individually or in combination.

Various numeric values are used in the present disclosure. The specific values are for example purposes and the aspects described are not limited to these specific values.

FIG. 11 illustrates an encoder 200. Variations of this encoder 200 are contemplated, but the encoder 200 is described below for purposes of clarity without describing all expected variations.

Before being encoded, the video sequence may go through pre-encoding processing (204), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (206) and processed in units of, for example, CUs. Each unit is encoded using, for example, either an intra or inter mode. When a unit is encoded in an intra mode, it performs intra prediction (208). In an inter mode, motion estimation and compensation (210) are performed. The encoder decides (214) which one of the intra mode or inter mode to use for encoding the unit, and indicates the intra/inter decision by, for example, a prediction mode flag. Prediction residuals are calculated, for example, by subtracting (216) the predicted block from the original image block.

The prediction residuals are then transformed (218) and quantized (220). The quantized transform coefficients, as well as motion vectors and other syntax elements, are entropy coded (232) to output a bitstream. The encoder can skip the transform and apply quantization directly to the non-transformed residual signal. The encoder can bypass both transform and quantization, in which case the residual is coded directly without the application of the transform or quantization processes.

The encoder decodes an encoded block to provide a reference for further predictions. The quantized transform coefficients are de-quantized (222) and inverse transformed (224) to decode prediction residuals. Combining (226) the decoded prediction residuals and the predicted block, an image block is reconstructed. In-loop filters (228) are applied to the reconstructed picture to perform, for example, deblocking/SAO (Sample Adaptive Offset) filtering to reduce encoding artifacts. The filtered image is stored at a reference picture buffer (212).

FIG. 12 illustrates a block diagram of a video decoder 250. In the decoder 250, a bitstream is decoded by the decoder elements as described below. Video decoder 250 generally performs a decoding pass reciprocal to the encoding pass as described in FIG. 11. The encoder 200 also generally performs video decoding as part of encoding video data.

In particular, the input of the decoder includes a video bitstream, which can be generated by video encoder 200. The bitstream is first entropy decoded (254) to obtain transform coefficients, motion vectors, and other coded information. The picture partition information indicates how the picture is partitioned. The decoder may therefore divide (256) the picture according to the decoded picture partitioning information. The transform coefficients are de-quantized (262) and inverse transformed (264) to decode the prediction residuals. Combining (266) the decoded prediction residuals and the predicted block, an image block is reconstructed. The predicted block can be obtained (271) from intra prediction (258) or motion-compensated prediction (i.e., inter prediction) (260). In-loop filters (268) are applied to the reconstructed image. The filtered image is stored at a reference picture buffer (270).

The decoded picture can further go through post-decoding processing (274), for example, an inverse color transform (e.g. conversion from YCbCr 4:2:0 to RGB 4:4:4) or an inverse remapping performing the inverse of the remapping process performed in the pre-encoding processing (204). The post-decoding processing can use metadata derived in the pre-encoding processing and signaled in the bitstream.

FIG. 13 is a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or WC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this disclosure, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this disclosure, for example, refining point cloud data and/or applying or removing a quantizer shift from the point cloud data.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this disclosure can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this disclosure, for example, refining point cloud data and/or applying or removing a quantizer shift from the point cloud data.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, a sequence parameter set, a picture parameter set, or a supplemental enhancement information message, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular quantization bin shift or set of shifts. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types. Embodiments include: a bitstream or signal that includes one or more of the described syntax elements, or variations thereof; a bitstream or signal that includes syntax conveying information generated according to any of the embodiments described; creating and/or transmitting and/or receiving and/or decoding a bitstream or signal that includes one or more of the described syntax elements, or variations thereof; creating and/or transmitting and/or receiving and/or decoding according to any of the embodiments described; and a method, process, apparatus, medium storing instructions, medium storing data, or signal according to any of the embodiments described.

Note that various hardware elements of one or more of the described embodiments are referred to as "modules" that carry out (e.g., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A point cloud decoding method comprising:
   obtaining data representing at least a first point position in a first point cloud and a second point position in a second point cloud, the first point cloud representing a first observation of a scene and the second point cloud representing a second observation of the scene;
   obtaining information identifying at least a first set of quantizer shifts associated with the first point cloud; and
   obtaining refined point cloud data including a refined point position based on at least the first point position, the first set of quantizer shifts, and the second point position.

2. A point cloud decoder apparatus comprising a processor configured to perform at least:
   obtaining data representing at least a first point position in a first point cloud and a second point position in a second point cloud, the first point cloud representing a first observation of a scene and the second point cloud representing a second observation of the scene;
   obtaining information identifying at least a first set of quantizer shifts associated with the first point cloud; and
   obtaining refined point cloud data including a refined point position based on at least the first point position, the first set of quantizer shifts, and the second point position.

3. The method of claim 1, wherein obtaining the refined point cloud data comprises performing a subtraction based on at least the first set of quantizer shifts.

4. The method of claim 1, further comprising:
   obtaining information identifying a second set of quantizer shifts associated with the second point cloud, the second set of quantizer shifts being different from the first set of quantizer shifts;
   wherein obtaining the refined point cloud data is further based on the second set of quantizer shifts.

5. The method of claim 1 wherein the first point cloud represents a left view of a scene and the second point cloud represents a right view of the scene.

6. The method of claim 1, wherein the first point cloud and the second point cloud are frames associated with different times.

7. The method of claim 1, wherein the first set of quantizer shifts comprises at least a first shift associated with the first point position in the first point cloud and a different second shift associated with a position of a different point in the first point cloud.

8. The method of claim 1, wherein the data representing the first point cloud comprises a first parameter ($y_1$) representing the first point position having a first quantization range, the data representing the second point cloud comprises a second parameter ($y_2$) representing the second point position having a second quantization range, and wherein obtaining the refined point cloud data comprises obtaining a third parameter ($\tilde{x}$) representing the refined point position in the quantization range of both the first parameter ($y_1$) and the second parameter ($y_2$).

9. The method of claim 1, wherein obtaining the refined point cloud data ($x_l$) based on the first point cloud ($y_l$) and the second point cloud ($y_r$) comprises selecting the refined first point cloud ($x_l$) to substantially maximize a product of factors comprising one or more of the following factors:
   a conditional probability $Pr(y_l|x_l)$ of the first point cloud ($y_l$) given the refined first point cloud ($x_l$),
   a conditional probability $Pr(y_r|g(x_l))$ of the second point cloud ($y_r$) given an estimate $g(x_l)$ of a second refined point cloud ($x_r$), where the estimate $g(x_l)$ is based on the first refined point cloud ($x_l$),
   a prior probability $Pr(x_l)$ of the first refined point cloud data ($x_l$), and
   a prior probability $Pr(g(x_l))$ of the estimate $g(x_l)$ of the second refined point cloud ($x_r$).

10. A point cloud encoding method comprising:
    obtaining data representing at least a first point position in a first point cloud and a second point position in a second point cloud, the first point cloud representing a first observation of a scene and the second point cloud representing a second observation of the scene;
    quantizing the first point position in the first point cloud and the second point position in the second point cloud, wherein quantizing the first point position in the first point cloud data comprises adding at least a first set of quantizer shifts to the first point position such that quantization bins of the first point position and the second point position are not aligned; and
    encoding in a bitstream the quantized first and second point clouds.

11. A point cloud encoding apparatus comprising a processor configured to perform at least:
    obtaining data representing at least a first point position in a first point cloud and a second point position in a second point cloud, the first point cloud representing a first observation of a scene and the second point cloud representing a second observation of the scene;
    quantizing the first point position in the first point cloud and the second point position in the second point cloud, wherein quantizing the first point position in the first point cloud data comprises adding at least a first set of quantizer shifts to the first point position such that quantization bins of the first point position and the second point position are not aligned; and
    encoding in a bitstream the quantized first and second point clouds.

12. The method of claim 10, further comprising encoding in the bitstream information indicating the first set of quantizer shifts.

13. The method of claim 10, wherein quantizing the first point position and the second point position includes adding a second set of quantizer shifts to the second point cloud, further comprising encoding in the bitstream information indicating the second set of quantizer shifts.

14. The method of claim 10, wherein the first point cloud represents a left view of a scene and the second point cloud represents a right view of the scene.

15. The decoder apparatus of claim 2, wherein obtaining the refined point cloud data comprises performing a subtraction based on at least the first set of quantizer shifts.

16. The decoder apparatus of claim 2, wherein the first point cloud represents a left view of a scene and the second point cloud represents a right view of the scene.

17. The decoder apparatus of claim 2, wherein the first point cloud and the second point cloud are frames associated with different times.

18. The encoding method of claim 10, wherein the first point cloud and the second point cloud are frames associated with different times.

19. The encoding apparatus of claim 11, wherein the first point cloud represents a left view of a scene and the second point cloud represents a right view of the scene.

20. The encoding apparatus of claim 11, wherein the first point cloud and the second point cloud are frames associated with different times.

\* \* \* \* \*